(12) United States Patent
Erben et al.

(10) Patent No.: US 7,794,896 B2
(45) Date of Patent: Sep. 14, 2010

(54) METHODS FOR MAKING HOLOGRAPHIC DATA STORAGE ARTICLES

(75) Inventors: Christoph Georg Erben, Clifton Park, NY (US); Eugene Pauling Boden, Scotia, NY (US); Kathryn Lynn Longley, Saratoga Springs, NY (US); Brian Lee Lawrence, Clifton Park, NY (US); Xiaolei Shi, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 946 days.

(21) Appl. No.: 11/636,856

(22) Filed: Dec. 11, 2006

(65) Prior Publication Data

US 2007/0097469 A1 May 3, 2007

Related U.S. Application Data

(63) Continuation-in-part of application No. 11/260,806, filed on Oct. 27, 2005.

(51) Int. Cl.
G03H 1/02 (2006.01)
(52) U.S. Cl. .................. 430/1; 430/2; 430/270.13; 430/945; 359/3
(58) Field of Classification Search ................ None
See application file for complete search history.

(56) References Cited

U.S. PATENT DOCUMENTS

| | | | |
|---|---|---|---|
| 3,416,922 A * | 12/1968 | Sus et al. ................ 430/270.1 |
| 3,850,633 A | 11/1974 | Moraw et al. | |
| 3,988,159 A * | 10/1976 | Schlesinger ............. 430/495.1 |
| 4,217,438 A | 8/1980 | Brunelle et al. | |
| 4,920,220 A | 4/1990 | Phaff | |
| 4,990,665 A * | 2/1991 | Griffing et al. ............. 564/265 |
| 5,438,439 A | 8/1995 | Mok et al. | |
| 5,440,669 A | 8/1995 | Rakuljic et al. | |
| 5,450,218 A | 9/1995 | Heanue et al. | |
| 6,322,931 B1 | 11/2001 | Cumpston et al. | |
| 6,574,174 B1 | 6/2003 | Amble et al. | |
| 2005/0136333 A1 | 6/2005 | Lawrence et al. | |
| 2005/0206984 A1 | 9/2005 | Kawano et al. | |
| 2005/0233246 A1 | 10/2005 | Boden et al. | |
| 2006/0073392 A1* | 4/2006 | Erben et al. ..................... 430/1 |
| 2007/0127329 A1* | 6/2007 | Erben et al. ............. 369/44.26 |
| 2007/0146835 A1* | 6/2007 | Erben et al. ..................... 359/3 |
| 2007/0147214 A1* | 6/2007 | Erben et al. ................. 369/103 |
| 2008/0055686 A1* | 3/2008 | Erben et al. ..................... 359/4 |
| 2008/0084592 A1* | 4/2008 | Boden et al. .................... 359/2 |
| 2008/0085455 A1* | 4/2008 | McLaughlin et al. .......... 430/1 |
| 2009/0081560 A1* | 3/2009 | Erben et al. ..................... 430/2 |
| 2009/0082580 A1* | 3/2009 | Erben et al. .................. 549/75 |

FOREIGN PATENT DOCUMENTS

WO WO2006039130 A1 4/2006

OTHER PUBLICATIONS

Kim et al., "preparation and holographic recording of diarylethene-doped photochromic films", ETRI J. vol. 25(4) pp. 253-257 (Aug. 2003).*
Biteau et al. "Large and Stable refractive index change in photochromic hybrid materials" Chem. Mater. vol. 10(7) pp. 1945-1950 (Jun. 1998).*
Irie Diarylethene for memories and switches, Chem. Rev. vol. 100(5) pp. 1685-1716 (2000).*
Coutandin et al. "diffusion of dye molecules in polymers above and below the glass transition temperature studied by the holographic grating technique", Macromol. vol. 18 pp. 587-598 (1985).*
Antonietti et al., "Diffusion of labeled macromolecules in molten polystyrenes studied by a holographic grating technique", Macromol. vol. 17 pp. 798-802 (1984).*
PCT Search Report dated Aug. 21, 2007.
Zhang et al, "Diarylethene Materials for Photon Mode Optical Storage", SPIE Proceedings, vol. 4930, pp. 93-104, 2002.
Co-pending U.S. Appl. No. 10/954,779, filed Sep. 30, 2004, entitled "Holographic Storage Medium".
Kenji Higashiguchi et al., "Photochromism of Dithienylethenes Containing Fluorinated Thiopehe Rings", Eur. J. Org. Chem., pp. 91-97, 2005.
Kenji Higashiguchi et al., "Fatigue Mechanism of Photochromic 1,2-Bis(3-thienyl)perfluorocyclopentene", The Chemical Society of Japan, Chemistry Letter, pp. 1358-1359, 2000.

* cited by examiner

*Primary Examiner*—Marin J Angebranndt
(74) *Attorney, Agent, or Firm*—Andrew J. Caruso

(57) ABSTRACT

A method of making a holographic data storage medium is provided. The method comprises: (a) providing an optically transparent substrate comprising at least one photochemically active dye; and (b) irradiating the optically transparent substrate at least one wavelength at which the optically transparent substrate has an absorbance in a range from about 0.1 to 1, to produce a modified optically transparent substrate comprising at least one optically readable datum and at least one photo-product of the photochemically active dye. The at least one wavelength is in a range from about 300 nanometers to about 800 nanometers. The optically transparent substrate is at least 100 micrometers thick, and comprises the photochemically active dye in an amount corresponding to from about 0.1 to about 10 weight percent based on a total weight of the optically transparent substrate.

32 Claims, No Drawings

US 7,794,896 B2

METHODS FOR MAKING HOLOGRAPHIC DATA STORAGE ARTICLES

CROSS REFERENCE TO RELATED APPLICATIONS

This application is a Continuation-In-Part of U.S. patent application Ser. No. 11/260,806, entitled "METHODS FOR MAKING HOLOGRAPHIC DATA STORAGE ARTICLES", filed 27 Oct. 2005, which is herein incorporated by reference.

BACKGROUND

The present disclosure relates to methods for making and using holographic data storage articles. Further, the disclosure relates to holographic data storage articles.

Holographic storage is the storage of data in the form of holograms, which are images of three dimensional interference patterns created by the intersection of two beams of light, in a photosensitive medium. The superposition of a signal beam, which contains digitally encoded data, and a reference beam forms an interference pattern within the volume of the medium resulting in a chemical reaction that changes or modulates the refractive index of the medium. This modulation serves to record as the hologram both the intensity and phase information from the signal. The hologram can later be retrieved by exposing the storage medium to the reference beam alone, which interacts with the stored holographic data to generate a reconstructed signal beam proportional to the initial signal beam used to store the holographic image. Thus, in holographic data storage, data is stored throughout the volume of the medium via three dimensional interference patterns.

Each hologram may contain anywhere from one to $1\times10^6$ or more bits of data. One distinct advantage of holographic storage over surface-based storage formats, including CDs or DVDs, is that a large number of holograms may be stored in an overlapping manner in the same volume of the photosensitive medium using a multiplexing technique, such as by varying the signal and/or reference beam angle, wavelength, or medium position. However, a major impediment towards the realization of holographic storage as a viable technique has been the development of a reliable and economically feasible storage medium.

Early holographic storage media employed inorganic photo-refractive crystals, such as doped or un-doped lithium niobate ($LiNbO_3$), in which incident light creates refractive index changes. These index changes are due to the photo-induced creation and subsequent trapping of electrons leading to an induced internal electric field that ultimately modifies the refractive index through a linear electro-optic effect. However, $LiNbO_3$ is expensive, exhibits relatively poor efficiency, fades over time, and requires thick crystals to observe any significant index changes.

More recent work has led to the development of polymers that can sustain larger refractive index changes owing to optically induced polymerization processes. These materials, which are referred to as photopolymers, have significantly improved optical sensitivity and efficiency relative to $LiNbO_3$ and its variants. In prior art processes, "single-chemistry" systems have been employed, wherein the media comprise a homogeneous mixture of at least one photo-active polymerizable liquid monomer or oligomer, an initiator, an inert polymeric filler, and optionally a sensitizer. Since it initially has a large fraction of the mixture in monomeric or oligomeric form, the medium may have a gel-like consistency that necessitates an ultraviolet (UV) curing step to provide form and stability. Unfortunately, the UV curing step may consume a large portion of the photo-active monomer or oligomer, leaving significantly less photo-active monomer or oligomer available for data storage. Furthermore, even under highly controlled curing conditions, the UV curing step may often result in variable degrees of polymerization and, consequently, poor uniformity among media samples.

Dye-doped data storage materials based on polymeric materials have been developed. The sensitivity of a dye-doped data storage material is dependent upon the concentration of the dye, the dye's absorption cross-section at the recording wavelength, the quantum efficiency of the photochemical transition, and the index change of the dye molecule for a unit dye density. However, as the product of dye concentration and the absorption cross-section increases, the storage medium (for example, an optical data storage disc) becomes opaque, which complicates both recording and readout.

Therefore, there is a need for holographic data storage methods whereby high volumetric data storage capacities can be achieved using photochemically active dyes that are efficient and sensitive to electromagnetic energy, such as light without interference from the main absorption peak of the dye.

SUMMARY

Disclosed herein are methods for producing and using holographic data storage media, which are valuable for reliably storing optically readable data.

In one aspect, the present invention is a method of making a holographic data storage medium. The method comprises: (a) providing an optically transparent substrate comprising at least one photochemically active dye; and (b) irradiating the optically transparent substrate at least one wavelength at which the optically transparent substrate has an absorbance in a range from about 0.1 to 1, to produce a modified optically transparent substrate comprising at least one optically readable datum and at least one photo-product of the photochemically active dye. The at least one wavelength is in a range from about 300 nanometers to about 800 nanometers. The optically transparent substrate is at least 100 micrometers thick, and comprises the photochemically active dye in an amount corresponding to from about 0.1 to about 10 weight percent based on a total weight of the optically transparent substrate.

In another aspect of the present invention, an optical writing and reading method is provided. The method comprises irradiating a holographic data storage medium with a signal beam possessing data (or at least one datum) and a reference beam simultaneously to partly convert the photochemically active dye into at least one photo-product and store the data carried by the signal beam as a hologram in the holographic data storage medium. The holographic storage medium comprises an optically transparent substrate and at least one photochemically active dye. The optically transparent substrate has a thickness of at least 100 micrometers, and comprises the photochemically active dye in an amount corresponding to from about 0.1 to about 10 weight percent based on a total weight of the optically transparent substrate, and a UV-visible absorbance in a range from about 0.1 to 1 at least one wavelength in a range from about 300 nanometers to about 800 nanometers. Then the holographic storage medium is irradiated with a read beam and the data contained by diffracted light from the hologram is read. In an embodiment, conversion of the photochemically active dye to at least one photo-product occurs such that the data storage medium comprises the dye as well as the photo-product to provide the refractive index contrast needed to produce the hologram.

In yet another aspect, the present invention is a method for using a holographic data storage article. The method comprises irradiating a holographic data storage medium in the holographic data storage article with electromagnetic energy having a first wavelength. The holographic data storage medium comprises an optically transparent substrate that is at least 100 micrometers thick, and comprises at least one photochemically active dye in an amount corresponding to from about 0.1 to about 10 weight percent based on a total weight of the optically transparent substrate. The irradiation is done at least one wavelength in a range from about 300 nanometers to about 800 nanometers at which the optically transparent substrate has a UV-visible absorbance in a range from about 0.1 to 1. A modified optically transparent substrate comprising at least one photo-product of the at least one photochemically active dye, and at least one optically readable datum stored as a hologram is formed. Then the modified optically transparent substrate is irradiated with electromagnetic energy having a second wavelength to read the hologram.

In still yet another aspect, the present invention is a method for manufacturing a holographic data storage medium. The method comprises forming a film of an optically transparent substrate comprising at least one optically transparent plastic material and at least one photochemically active dye having a UV-visible absorbance in a range between about 0.1 and about 1 at a wavelength in a range between about 300 nanometers and about 800 nanometers, said film having a thickness of at least 100 micrometers; wherein the optically transparent substrate comprises from about 0.1 to about 10 weight percent of the optically transparent substrate.

In another aspect, the present invention is a holographic data storage medium. The holographic data storage medium comprises an optically transparent substrate comprising at least one optically transparent plastic material, at least one photochemically active dye, and at least one photo-product thereof. The at least one photo-product is patterned within the optically transparent substrate to provide at least one optically readable datum comprised within the holographic storage medium. The optically transparent substrate is at least 100 micrometers thick and comprises the photochemically active dye in an amount corresponding to from about 0.1 to about 10 weight percent based on a total weight of the optically transparent substrate. The optically transparent substrate has a UV-visible absorbance in a range from about 0.1 to 1 at least one wavelength in a range from about 300 nanometers to about 800 nanometers.

In yet another aspect, the present invention provides a polymeric photochemically active dye composition comprising structural units XXI

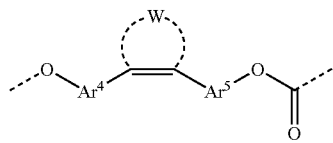

XXI wherein W is a divalent $C_2$-$C_{20}$ aliphatic radical, a $C_3$-$C_{50}$ aromatic radical, or a $C_3$-$C_{50}$ cycloaliphatic radical; and $Ar^4$ and $Ar^5$ are each independently a $C_2$-$C_{40}$ aromatic radical.

These and other features, aspects, and advantages of the present invention may be more understood more readily by reference to the following detailed description.

DETAILED DESCRIPTION

Some aspects of the present invention and general scientific principles used herein can be more clearly understood by referring to U.S. Patent Application 2005/0136333 (Ser. No. 10/742,461), which was published on Jun. 23, 2005; and U.S. Patent Application 2006/0073392 (Ser. No. 10/954,779), which was published on Apr. 6, 2006; both which are incorporated herein by reference in their entirety.

As defined herein, the term M/# denotes the capacity of a data storage medium, and can be measured as a function of the total number of multiplexed holograms that can be recorded at a volume element of the data storage medium at a given diffraction efficiency. M/# depends upon various parameters, such as the change in refractive index ($\Delta n$), the thickness of the medium, and the dye concentration. These terms are described further in this disclosure. The M/# is defined as shown in equation (1):

$$M/\# = \sum_{i=1}^{N} \sqrt{\eta_i} \qquad \text{Equation (1)}$$

where $\eta_i$ is diffraction efficiency of the $i^{th}$ hologram, and N is the number of recorded holograms. The experimental setup for M/# measurement for a test sample at a chosen wavelength, for example, at 532 nanometers or 405 nanometers involves positioning the testing sample on a rotary stage that is controlled by a computer. The rotary stage has a high angular resolution, for example, about 0.0001 degree. An M/# measurement involves two steps: recording and readout. At recording, multiple planewave holograms are recorded at the same location on the same sample. A plane wave hologram is a recorded interference pattern produced by a signal beam and a reference beam. The signal and reference beams are coherent to each other. They are both planewaves that have the same power and beam size, incident at the same location on the sample, and polarized in the same direction. Multiple planewave holograms are recorded by rotating the sample. Angular spacing between two adjacent holograms is about 0.2 degree. This spacing is chosen so that their impact to the previously recorded holograms, when multiplexing additional holograms, is minimal and at the same time, the usage of the total capacity of the media is efficient. Recording time for each hologram is generally the same in M/# measurements. At readout, the signal beam is blocked. The diffracted signal is measured using the reference beam and an amplified photo-detector. Diffracted power is measured by rotating the sample across the recording angle range with a step size of about 0.004 degree. The power of the reference beam used for readout is typically about 2-3 orders of magnitude smaller than that used at recording. This is to minimize hologram erasure during readout while maintaining a measurable diffracted signal. From the diffracted signal, the multiplexed holograms can be identified from the diffraction peaks at the hologram recording angles. The diffraction efficiency of the $i^{th}$ hologram, $\eta_i$, is then calculated by using equation (2):

$$\eta_i = \frac{P_{i,diffracted}}{P_{reference}} \qquad \text{Equation (2)}$$

where $P_{i, diffracted}$ is the diffracted power of the $i^{th}$ hologram. M/# is then calculated using the diffraction efficiencies of the holograms and equation (1). Thus, a holographic plane wave characterization system may be used to test the characteristics of the data storage material, especially multiplexed holograms. Further, the characteristics of the data storage material can also be determined by measuring the diffraction efficiency.

As defined herein, the term "volume element" means a three dimensional portion of the total volume of an optically transparent substrate or a modified optically transparent substrate.

As defined herein, the term "optically readable datum" can be understood as being made up of one or more volume elements of a first or a modified optically transparent substrate containing a "hologram" of the data to be stored. The refractive index within an individual volume element may be constant throughout the volume element, as in the case of a volume element that has not been exposed to electromagnetic radiation, or in the case of a volume element in which the photochemically active dye has been reacted to the same degree throughout the volume element. It is believed that most volume elements that have been exposed to electromagnetic radiation during the holographic data writing process will contain a complex holographic pattern and as such the refractive index within the volume element will vary across the volume element. In instances in which the refractive index within the volume element varies across the volume element, it is convenient to regard the volume element as having an "average refractive index" which may be compared to the refractive index of the corresponding volume element prior to irradiation. Thus, in one embodiment an optically readable datum comprises at least one volume element having a refractive index that is different from a (the) corresponding volume element of the optically transparent substrate prior to irradiation. Data storage is achieved by locally changing the refractive index of the data storage medium in a graded fashion (continuous sinusoidal variations), rather than discrete steps, and then using the induced changes as diffractive optical elements.

The capacity to store data as holograms (M/#) is also directly proportional to the ratio of the change in refractive index per unit dye density ($\Delta n/N0$) at the wavelength used for reading the data to the absorption cross section ($\sigma$) at a given wavelength used for writing the data as a hologram. The refractive index change per unit dye density is given by the ratio of the difference in refractive index of the volume element before irradiation minus the refractive index of the same volume element after irradiation to the density of the dye molecules. The refractive index change per unit dye density has a unit of (centimeter)$^3$. Thus in an embodiment, the optically readable datum comprises at least one volume element wherein the ratio of the change in the refractive index per unit dye density of the at least one volume element to an absorption cross section of the at least one photochemically active dye is at least about $10^{-5}$ expressed in units of centimeter.

Sensitivity (S) is a measure of the diffraction efficiency of a hologram recorded using a certain amount of light fluence (F). The light fluence (F) is given by the product of light intensity (I) and recording time (t). Mathematically, sensitivity is given by equation (3), $$S = \frac{\sqrt{\eta}}{I \cdot t \cdot L}(cm/J) \quad \text{Equation (3)}$$

wherein I is the intensity of the recording beam, "t" is the recording time, L is the thickness of the recording (or data storage) medium (example, disc), and $\eta$ is the diffraction efficiency. Diffraction efficiency is given by equation (4), $$\eta = \sin^2\left(\frac{\pi \cdot \Delta n \cdot L}{\lambda \cdot \cos(\theta)}\right) \quad \text{Equation (4)}$$

wherein $\lambda$ is the wavelength of light in the recording medium, $\theta$ is the recording angle in the media, and $\Delta n$ is the refractive index contrast of the grating, which is produced by the recording process, wherein the dye molecule undergoes a photochemical conversion.

The absorption cross section is a measurement of an atom or molecule's ability to absorb light at a specified wavelength, and is measured in square cm/molecule. It is generally denoted by $\sigma(\lambda)$ and is governed by the Beer-Lambert Law for optically thin samples as shown in Equation (5), $$\sigma(\lambda) = \ln(10) \cdot \frac{\text{Absorbance}(\lambda)}{N_o \cdot L}(cm^2) \quad \text{Equation (5)}$$

wherein $N_0$ is the concentration in molecules per cubic centimeter, and L is the sample thickness in centimeters.

Quantum efficiency (QE) is a measure of the probability of a photochemical transition for each absorbed photon of a given wavelength. Thus, it gives a measure of the efficiency with which incident light is used to achieve a given photochemical conversion, also called as a bleaching process. QE is given by equation (6), $$QE = \frac{hc/\lambda}{\sigma \cdot F_0} \quad \text{Equation (6)}$$

wherein "h" is the Planck's constant, "c" is the velocity of light, $\sigma(\lambda)$ is the absorption cross section at the wavelength $\lambda$, and $F_0$ is the bleaching fluence. The parameter $F_0$ is given by the product of light intensity (I) and a time constant ($\tau$) that characterizes the bleaching process.

The term "optically transparent" as applied to an optically transparent substrate or an optically transparent plastic material means that they have an absorbance of less than 1, that is at least 10 percent of incident light is transmitted through the material at least one wavelength in a range between about 300 and about 800 nanometers.

As defined herein, the term "an optically transparent substrate" denotes a combination of an optically transparent plastic material and at least one photochemically active dye, which has an absorbance of less than 1, that is, at least 10 percent of incident light is transmitted through the material at least one wavelength in a range between about 300 and about 800 nanometers.

As defined herein, the term "optically transparent plastic material" means a plastic material which has an absorbance of less than 1, that is, at least 10 percent of incident light is transmitted through the material) at least one wavelength in a range between about 300 and about 800 nanometers.

As used herein, the term "aromatic radical" refers to an array of atoms having a valence of at least one comprising at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having $4n+2$ "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include nonaromatic components. For example, a benzyl group is an aromatic radical which comprises a phenyl ring (the aromatic group) and a methylene group (the nonaromatic component). Similarly a tetrahydronaphthyl radical is an aromatic radical comprising an aromatic group ($C_6H_3$) fused to a nonaromatic component —$(CH_2)_4$—. For convenience, the term "aromatic radical" is defined herein to encompass a wide range of functional groups such as alkyl groups, alkenyl groups, alkynyl groups, haloalkyl groups, haloaromatic groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylphenyl radical is a $C_7$ aromatic radical comprising a methyl group, the methyl group being a functional group which is an alkyl group. Similarly, the 2-nitrophenyl group is a $C_6$ aromatic radical comprising a nitro group, the nitro group being a functional group. Aromatic radicals include halogenated aromatic radicals such as 4-trifluoromethylphenyl, hexafluoroisopropylidenebis(4-phen-1-yloxy) (i.e., —$OPhC(CF_3)_2PhO$—), 4-chloromethylphen-1-yl, 3-trifluorovinyl-2-thienyl, 3-trichloromethylphen-1-yl (i.e., 3-$CCl_3Ph$-), 4-(3-bromoprop-1-yl)phen-1-yl (i.e., 4-$BrCH_2CH_2CH_2Ph$-), and the like. Further examples of aromatic radicals include 4-allyloxyphen-1-oxy, 4-aminophen-1-yl (i.e., 4-$H_2NPh$-), 3-aminocarbonylphen-1-yl (i.e., $NH_2COPh$-), 4-benzoylphen-1-yl, dicyanomethylidenebis(4-phen-1-yloxy) (i.e., —$OPhC(CN)_2PhO$—), 3-methylphen-1-yl, methylenebis(4-phen-1-yloxy) (i.e., —$OPhCH_2PhO$—), 2-ethylphen-1-yl, phenylethenyl, 3-formyl-2-thienyl, 2-hexyl-5-furanyl, hexamethylene-1,6-bis(4-phen-1-yloxy) (i.e., —$OPh(CH_2)_6PhO$—), 4-hydroxymethylphen-1-yl (i.e., 4-$HOCH_2Ph$-), 4-mercaptomethylphen-1-yl (i.e., 4-$HSCH_2Ph$-), 4-methylthiophen-1-yl (i.e., 4-$CH_3SPh$-), 3-methoxyphen-1-yl, 2-methoxycarbonylphen-1-yloxy (e.g., methyl salicyl), 2-nitromethylphen-1-yl (i.e., 2-$NO_2CH_2Ph$), 3-trimethylsilylphen-1-yl, 4-t-butyldimethylsilylphenl-1-yl, 4-vinylphen-1-yl, vinylidenebis(phenyl), and the like. The term "a $C_3$-$C_{10}$ aromatic radical" includes aromatic radicals containing at least three but no more than 10 carbon atoms. The aromatic radical 1-imidazolyl ($C_3H_2N_2$—) represents a $C_3$ aromatic radical. The benzyl radical ($C_7H_7$—) represents a $C_7$ aromatic radical.

As used herein the term "cycloaliphatic radical" refers to a radical having a valence of at least one, and comprising an array of atoms which is cyclic but which is not aromatic. As defined herein a "cycloaliphatic radical" does not contain an aromatic group. A "cycloaliphatic radical" may comprise one or more noncyclic components. For example, a cyclohexylmethyl group ($C_6H_{11}CH_2$—) is a cycloaliphatic radical which comprises a cyclohexyl ring (the array of atoms which is cyclic but which is not aromatic) and a methylene group (the noncyclic component). The cycloaliphatic radical may include heteroatoms such as nitrogen, sulfur, selenium, silicon and oxygen, or may be composed exclusively of carbon and hydrogen. For convenience, the term "cycloaliphatic radical" is defined herein to encompass a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylcyclopent-1-yl radical is a $C_6$ cycloaliphatic radical comprising a methyl group, the methyl group being a functional group which is an alkyl group. Similarly, the 2-nitrocyclobut-1-yl radical is a $C_4$ cycloaliphatic radical comprising a nitro group, the nitro group being a functional group. A cycloaliphatic radical may comprise one or more halogen atoms which may be the same or different. Halogen atoms include, for example; fluorine, chlorine, bromine, and iodine. Cycloaliphatic radicals comprising one or more halogen atoms include 2-trifluoromethylcyclohex-1-yl, 4-bromodifluoromethylcyclooct-1-yl, 2-chlorodifluoromethylcyclohex-1-yl, hexafluoroisopropylidene-2,2-bis(cyclohex-4-yl) (i.e., —$C_6H_{10}C(CF_3)_2C_6H_{10}$—), 2-chloromethylcyclohex-1-yl, 3-difluoromethylenecyclohex-1-yl, 4-trichloromethylcyclohex-1-yloxy, 4-bromodichloromethylcyclohex-1-ylthio, 2-bromoethylcyclopent-1-yl, 2-bromopropylcyclohex-1-yloxy (e.g., $CH_3CHBrCH_2C_6H_{10}O$—), and the like. Further examples of cycloaliphatic radicals include 4-allyloxycyclohex-1-yl, 4-aminocyclohex-1-yl (i.e., $H_2C_6H_{10}O$—), 4-aminocarbonylcyclopent-1-yl (i.e., $NH_2COC_5H_8$—), 4-acetyloxycyclohex-1-yl, 2,2-dicyanoisopropylidenebis(cyclohex-4-yloxy) (i.e., —$OC_6H_{10}C(CN)_2C_6H_{10}O$—), 3-methylcyclohex-1-yl, methylenebis(cyclohex-4-yloxy) (i.e., —$OC_6H_{10}CH_2C_6H_{10}O$—), 1-ethylcyclobut-1-yl, cyclopropylethenyl, 3-formyl-2-terahydrofuranyl, 2-hexyl-5-tetrahydrofuranyl, hexamethylene-1,6-bis(cyclohex-4-yloxy) (i.e., —$OC_6H_{10}(CH_2)_6C_6H_{10}O$—), 4-hydroxymethylcyclohex-1-yl (i.e., 4-$HOCH_2C_6H_{10}$—), 4-mercaptomethylcyclohex-1-yl (i.e., 4-$HSCH_2C_6H_{10}$—), 4-methylthiocyclohex-1-yl (i.e., 4-$CH_3SC_6H_{10}O$—), 4-methoxycyclohex-1-yl, 2-methoxycarbonylcyclohex-1-yloxy(2-$CH_3OCOC_6H_{10}O$—), 4-nitromethylcyclohex-1-yl (i.e., $NO_2CH_2C_6H_{10}$—), 3-trimethylsilylcyclohex-1-yl, 2-t-butyldimethylsilylcyclopent-1-yl, 4-trimethoxysilylethylcyclohex-1-yl (e.g., $(CH_3O)_3SiCH_2CH_2C_6H_7O$—), 4-vinylcyclohexen-1-yl, vinylidenebis(cyclohexyl), and the like. The term "a $C_3$-$C_{10}$ cycloaliphatic radical" includes cycloaliphatic radicals containing at least three but no more than 10 carbon atoms. The cycloaliphatic radical 2-tetrahydrofuranyl ($C_4H_7O$—) represents a $C_4$ cycloaliphatic radical. The cyclohexylmethyl radical ($C_6H_{11}CH_2$—) represents a $C_7$ cycloaliphatic radical.

As used herein the term "aliphatic radical" refers to an organic radical having a valence of at least one consisting of a linear or branched array of atoms which is not cyclic. Aliphatic radicals are defined to comprise at least one carbon atom. The array of atoms comprising the aliphatic radical may include heteroatoms such as nitrogen, sulfur, silicon, selenium and oxygen or may be composed exclusively of carbon and hydrogen. For convenience, the term "aliphatic radical" is defined herein to encompass, as part of the "linear or branched array of atoms which is not cyclic" a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylpent-1-yl radical is a $C_6$ aliphatic radical comprising a methyl group, the methyl group being a functional group which is an alkyl group. Similarly, the 4-nitrobut-1-yl group is a $C_4$ aliphatic radical comprising a nitro group, the nitro group being a functional group. An aliphatic radical may be a haloalkyl group which comprises one or more halogen atoms which may be the same or different. Halogen atoms include, for example; fluorine, chlorine, bromine, and iodine. Aliphatic radicals comprising one or more halogen atoms include the alkyl halides trifluoromethyl, bromodifluoromethyl, chlorodifluoromethyl, hexafluoroisopropylidene, chloromethyl, difluorovinylidene, trichloromethyl, bromodichloromethyl, bromoethyl, 2-bromotrimethylene (e.g., —CH$_2$CHBrCH$_2$—), and the like. Further examples of aliphatic radicals include allyl, aminocarbonyl (i.e., —CONH$_2$), carbonyl, 2,2-dicyanoisopropylidene (i.e., —CH$_2$C(CN)$_2$CH$_2$—), methyl (i.e., —CH$_3$), methylene (i.e., —CH$_2$—), ethyl, ethylene, formyl (i.e., —CHO), hexyl, hexamethylene, hydroxymethyl (i.e., —CH$_2$OH), mercaptomethyl (i.e., —CH$_2$SH), methylthio (i.e., —SCH$_3$), methylthiomethyl (i.e., —CH$_2$SCH$_3$), methoxy, methoxycarbonyl (i.e., CH$_3$OCO—), nitromethyl (i.e., —CH$_2$NO$_2$), thiocarbonyl, trimethylsilyl (i.e., (CH$_3$)$_3$Si—), t-butyldimethylsilyl, 3-trimethyoxysilylpropyl (i.e., (CH$_3$O)$_3$SiCH$_2$CH$_2$CH$_2$—), vinyl, vinylidene, and the like. By way of further example, a $C_1$-$C_{10}$ aliphatic radical contains at least one but no more than 10 carbon atoms. A methyl group (i.e., CH$_3$—) is an example of a $C_1$ aliphatic radical. A decyl group (i.e., CH$_3$(CH$_2$)$_9$—) is an example of a $C_{10}$ aliphatic radical.

The present invention provides methods for optical data storage use in holographic data storage and retrieval. These holographic storage media include an optically transparent substrate comprising an optically transparent plastic material and at least one photochemically active dye. The photochemically active dye has desirable optical properties, such as a relatively low absorption cross-section while having a relatively high refractive index change and/or relatively high quantum efficiency. High quantum efficiency also leads to a higher sensitivity since sensitivity is directly proportional to the product of quantum efficiency and refractive index change (defined as Δn). Writing of data as a hologram into the optically transparent substrate comprising the photochemical dye is due to the dye undergoing a photochemical conversion at the write wavelength, thereby producing a modified optically transparent substrate comprising at least one optically readable datum. The sensitivity of a dye-doped data storage material is dependent upon the concentration of the dye ($N_0$), the dye's absorption cross-section at the recording wavelength, the quantum efficiency QE of the photochemical transition, and the index change of the dye molecule for a unit dye density ($\Delta n_0/N_0$). However, as the product of dye concentration and the absorption cross-section increases, the disc becomes opaque, which complicates both recording and readout. Therefore, dyes of interest for achieving high M/#s are those materials that undergo a partial photochemical transformation accompanied with a high refractive index change and a high quantum efficiency at the wavelength that is used for writing data, one that is removed from the main UV-visible absorption peak of the dye.

A photochemically active dye may be described as a dye molecule that has an optical absorption resonance characterized by a center wavelength associated with the maximum absorption and a spectral width (full width at half of the maximum, FWHM) of less than 500 nanometers (hereinafter abbreviated as "nm"). In addition, the photochemically active dye molecule undergoes a partial light induced chemical reaction when exposed to light with a wavelength within the absorption range to form at least one photo-product. This reaction can be a photo-decomposition reaction, such as oxidation, reduction, or bond breaking to form smaller constituents, or a molecular rearrangement, such as a sigmatropic rearrangement, or addition reactions including pericyclic cycloadditions. Thus in an embodiment, data storage in the form of holograms is achieved wherein the photo-product is patterned (for example, in a graded fashion) within the modified optically transparent substrate to provide the at least one optically readable datum.

The photochemically active dye (hereinafter sometimes referred to as the "dye") is selected and utilized on the basis of several characteristics, including the ability to change the refractive index of the dye upon exposure to light; the efficiency with which the light creates the refractive index change; and the separation between the wavelength at which the dye shows an maximum absorption and the desired wavelength or wavelengths to be used for storing and/or reading the data. The choice of the photochemically active dye depends upon many factors, such as sensitivity (S) of the holographic storage media, concentration ($N_0$) of the photochemically active dye, the dye's absorption cross section ($\sigma$) at the recording wavelength, the quantum efficiency (QE) of the photochemical conversion of the dye, and the refractive index change per unit dye density (i.e., $\Delta n/N_0$). Of these factors, QE, $\Delta n/N_0$, and $\sigma$ are more important factors which affect the sensitivity (S) and also information storage capacity (M/#). Preferred photochemically active dyes are those that show a high refractive index change per unit dye density ($\Delta n/N_0$) (as explained previously), a high quantum efficiency in the photochemical conversion step, and a low absorption cross-section at the wavelength of the electromagnetic radiation used for the photochemical conversion.

The photochemically active dye is one that is capable of being written and read by electromagnetic radiation. It is desirable to use dyes that can be written (with a signal beam) and read (with a read beam) using actinic radiation i.e., radiation having a wavelength from about 300 nm to about 1,100 nm. The wavelengths at which writing and reading are accomplished are about 300 nm to about 800 nm. In one embodiment, the writing and reading are accomplished at a wavelength of about 400 nm to about 600 nm. In another embodiment, the writing and reading are accomplished at a wavelength of about 400 to about 550 nanometers. In still another embodiment, the reading wavelength is such that it is shifted by 0 nm to about 400 nm from the writing wavelength. Exemplary wavelengths at which writing and reading are accomplished are about 405 nanometers and about 532 nanometers. In an embodiment, the photochemically active dye is a vicinal diarylethene. In another embodiment, the photochemically active dye is a photo-product derived from a vicinal diarylethene. In still another embodiment, the photochemically active dye is a nitrone. In still yet another embodiment, the photochemically active dye is a nitrostilbene. Any combination comprising two or more members selected from the group consisting of a vicinal diarylethene, a nitrone, a photo-product derived from a vicinal diarylethene, and a nitrostilbene can also be used.

An exemplary class of vicinal diarylethene compounds can be represented by generic structure (I),

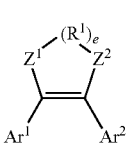

(I)

wherein "e" is 0 or 1; $R^1$ is a bond, an oxygen atom, a substituted nitrogen atom, a sulfur atom, a selenium atom, a divalent $C_1$-$C_{20}$ aliphatic radical, a halogenated divalent $C_1$-$C_{20}$ aliphatic radical, a divalent $C_3$-$C_{20}$ cycloaliphatic radical, a halogenated divalent $C_1$-$C_{20}$ cycloaliphatic radical, or a divalent $C_2$-$C_{30}$ aromatic radical; $Ar^1$ and $Ar^2$ are each independently a $C_2$-$C_{40}$ aromatic radical; and $Z^1$ and $Z^2$ are independently a bond, a hydrogen atom, a monovalent $C_1$-$C_{20}$ aliphatic radical, divalent $C_1$-$C_{20}$ aliphatic radical, a monovalent $C_3$-$C_{20}$ cycloaliphatic radical, a divalent $C_3$-$C_{20}$ cycloaliphatic radical, a monovalent $C_2$-$C_{30}$ aromatic radical, or a divalent $C_2$-$C_{30}$ aromatic radical. Table I below illustrates individual vicinal diarylethene compounds encompassed by the chemical genus represented by formula I. It should be noted that in the exemplary structures listed in the table each of the aromatic radicals $Ar^1$ and $Ar^2$ are identical as are the groups $Z^1$ and $Z^2$. It will be understood by those skilled in the art that $Ar^1$ may differ in structure from $Ar^2$ and that $Z^1$ may differ in structure from $Z^2$, and that such species are encompassed within generic structure I and are included within the scope of the instant invention.

TABLE I

Vicinal Diarylethene Compounds Represented by Formula I

| Example | $R^1$ | "e" | $Ar^1$ & $Ar^2$ | $Z^1$ & $Z^2$ |
|---|---|---|---|---|
| I-1 | 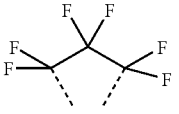 | 1 | 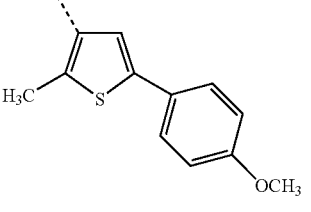 | bond |
| I-2 | 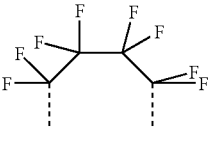 | 1 | 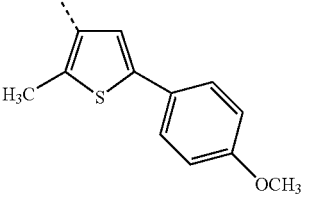 | bond |
| I-3 | 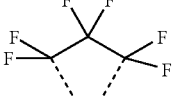 | 1 | 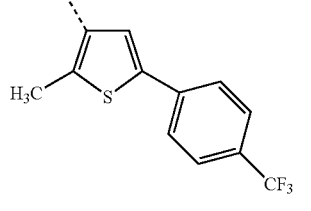 | bond |
| I-4 | 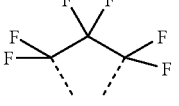 | 1 | 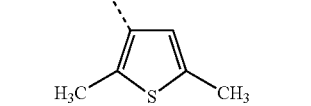 | bond |
| I-5 | — | 0 | 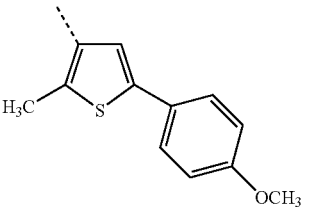 | $CF_3$ |
| I-6 | 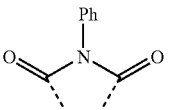 | 1 | 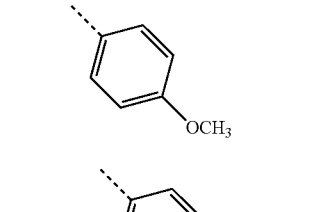 | bond |
| I-7 |  | 1 | 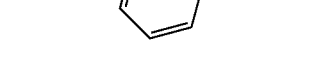 | bond |

In another embodiment, "e" is 0; and $Z^1$ and $Z^2$ are $C_1$-$C_5$ alkyl, $C_1$-$C_5$ perfluoroalkyl, or CN. In still another embodiment, e is 1, and $Z^1$ and $Z^2$ are independently $CH_2$, $CF_2$, or C=O. In yet another embodiment, $Ar^1$ and $Ar^2$ are each independently an aromatic radical selected from the group consisting of phenyl, anthracenyl, phenanthrenyl, pyridinyl, pyridazinyl, 1H-phenalenyl and naphthyl, optionally substituted by one or more substituents, wherein the substituents are each independently $C_1$-$C_3$ alkyl, $C_1$-$C_3$ perfluoroalkyl, $C_1$-$C_3$ alkoxy, or fluorine. In yet another embodiment at least one of $Ar^1$ and $Ar^2$ comprises one or more aromatic moieties selected from the group consisting of structures (II), (III), and (IV),

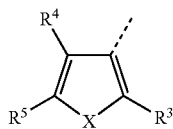
(II)

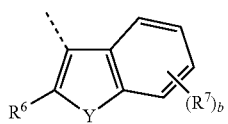
(III)

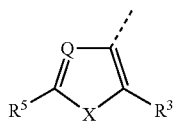
(IV)

wherein $R^3$, $R^4$, $R^5$, and $R^6$ are independently hydrogen, a halogen atom, a nitro group, a cyano group, a $C_1$-$C_{10}$ aliphatic radical, a $C_3$-$C_{10}$ cycloaliphatic radical, or a $C_2$-$C_{10}$ aromatic radical; $R^7$ is independently at each occurrence a halogen atom, a nitro group, a cyano group, a $C_1$-$C_{10}$ aliphatic radical, a $C_3$-$C_{10}$ cycloaliphatic radical, or a $C_2$-$C_{10}$ aromatic radical; "b" is an integer from and including 0 to and including 4; X and Y are selected from the group consisting of sulfur, selenium, oxygen, NH, and nitrogen substituted by a $C_1$-$C_{10}$ aliphatic radical, a $C_3$-$C_{10}$ cycloaliphatic radical, or a $C_2$-$C_{10}$ aromatic radical; and Q is CH or N. In one embodiment, at least one of $R^3$, $R^4$, $R^5$, and $R^6$ is selected from the group consisting of hydrogen, fluorine, chlorine, bromine, $C_1$-$C_3$ alkyl, $C_1$-$C_3$ perfluoroalkyl, cyano, phenyl, pyridyl, isoxazolyl, —CHC(CN)$_2$.

As mentioned previously, preferred photochemically active dyes are those that show a high refractive index change, a high quantum efficiency in the photochemical conversion step, and a low absorption cross-section at the wavelength of the electromagnetic radiation used for the photochemical conversion. One such example of a suitable photochemically active dye is illustrated by the vicinal diarylethene (V),

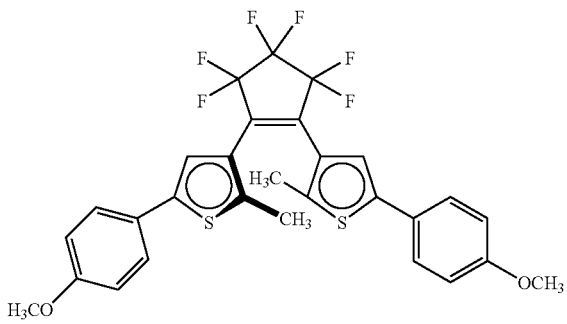
(V)

which can be named as 1,2-bis{2-(4-methoxyphenyl)-5-methylthien-4-yl}-3,3,4,4,5,5-hexafluorocyclopent-1-ene.

Compound (V) shows a UV absorbance of about 1 at about 600 nanometers, the wavelength at which it cyclizes intramolecularly, and a high QE of about 0.8 for the cyclization step. Vicinal diarylethene (V) is also represented in the Table above as Example I-1 wherein, with reference to generic structure I, $R^1$ is a perfluorotrimethylene group, "e" is 1, $Z^1$ and $Z^2$ are each bonds, and $Ar^1$ and $Ar^2$ are each 2-(4-methoxyphenyl)-5-methylthien-4-yl moieties.

Other examples of suitable vicinal diarylethenes that can be used as photochemically active dyes include diarylperfluorocyclopentenes, diarylmaleic anhydrides, diarylmaleimides, or a combination comprising at least one of the foregoing diarylethenes. The vicinal diarylethenes can be prepared using methods known in the art.

The vicinal diarylethenes can be reacted in the presence of actinic radiation (i.e. radiation that can produce a photochemical reaction), such as light. In one embodiment, an exemplary vicinal diarylethene can undergo a reversible cyclization reaction in the presence of light (hν) according to the following equation (7), Equation (7)

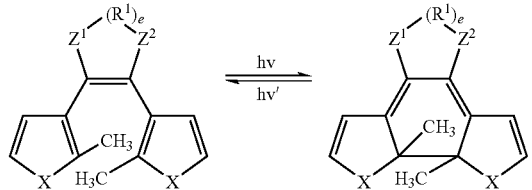

wherein $Z^1$, $Z^2$, $R^1$ and "e" are defined as in structure (I) and X is defined as in structure (II). The cyclization reactions can be used to produce holograms. The holograms can be produced by using radiation to effect the cyclization reaction or the reverse ring-opening reaction. Thus, in an embodiment, a photo-product derived from a vicinal diarylethene can be used as a photochemically active dye. Such photo-products derived from the vicinal diarylethene can be represented by a formula (VI), (VI)

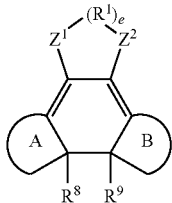

wherein "e", $R^1$, $Z^1$, and $Z^2$ are as described for the vicinal diarylethene having formula (I), A and B are fused rings, and $R^8$ and $R^9$ are each independently a hydrogen atom, an aliphatic radical, a cycloaliphatic radical, or an aromatic radical. One or both fused rings A and B may comprise carbocyclic rings which do not have heteroatoms. In another embodiment, the fused rings A and B may comprise one or more heteroatoms selected from the group consisting of oxygen, nitrogen, and sulfur. Non-limiting examples of compounds falling within the scope of formula (VI) include the compounds (VII) and (VIII)

(VII)

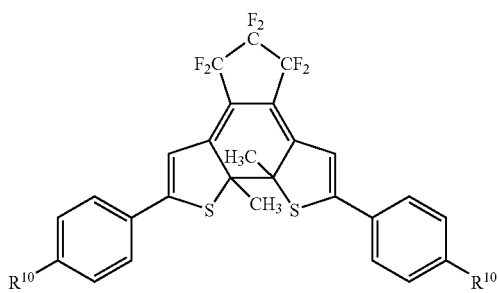

(VIII)

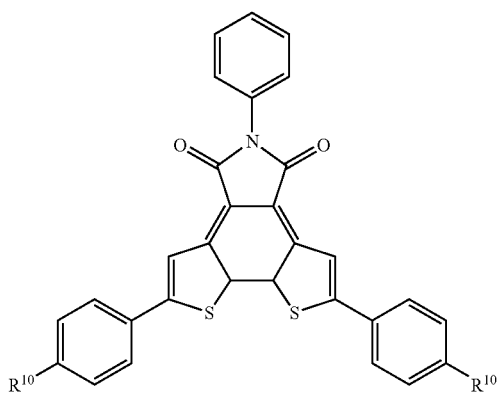

wherein $R^{10}$ is independently at each occurrence a hydrogen atom, a methoxy radical, or a trifluoromethyl radical.

Nitrones can also be used as photochemically active dyes for producing the holographic data storage media. An exemplary nitrone generally comprises an aryl nitrone structure represented by the structure (IX), (IX)

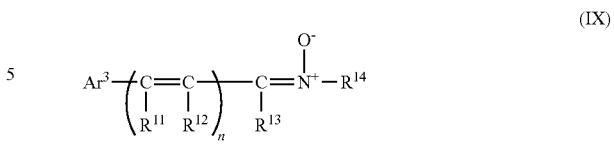

wherein $Ar^3$ is an aromatic radical, each of $R^{11}$, $R^{12}$, and $R^{13}$ is a hydrogen atom, an aliphatic radical, a cycloaliphatic radical, or an aromatic radical; $R^{14}$ is an aliphatic radical or an aromatic radical, and "n" is an integer having a value of from 0 to 4. In an embodiment, the radical $R^{14}$ comprises one or more electron withdrawing substituents selected from the group consisting of

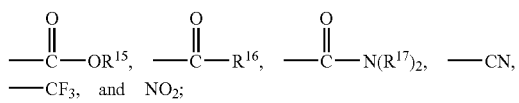

wherein $R^{15}$-$R^{17}$ are independently a $C_1$-$C_{10}$ aliphatic radical, a $C_3$-$C_{10}$ cycloaliphatic radical, or a $C_2$-$C_{10}$ aromatic radical.

As can be seen from structure (IX), the nitrones may be α-aryl-N-arylnitrones or conjugated analogs thereof in which the conjugation is between the aryl group and an α-carbon atom. The α-aryl group is frequently substituted, often by a dialkylamino group, in which the alkyl groups contain 1 to about 4 carbon atoms. Suitable, non-limiting examples of nitrones include α-(4-diethylaminophenyl)-N-phenylnitrone; α-(4-diethylaminophenyl)-N-(4-chlorophenyl)-nitrone, α-(4-diethylaminophenyl)-N-(3,4-dichlorophenyl)-nitrone, α-(4-diethylaminophenyl)-N-(4-carbethoxyphenyl)-nitrone, α-(4-diethylaminophenyl)-N-(4-acetylphenyl)-nitrone, α-(4-dimethylaminophenyl)-N-(4-cyanophenyl)-nitrone, α-(4-methoxyphenyl)-N-(4-cyanophenyl)nitrone, α-(9-julolidinyl)-N-phenylnitrone, α-(9-julolidinyl)-N-(4-chlorophenyl)nitrone, α-(4-Dimethylamino)styryl-N-phenyl Nitrone, α-Styryl-N-phenyl nitrone, α-[2-(1,1-diphenylethenyl)]-N-phenylnitrone, α-[2-(-phenylpropenyl)]-N-phenylnitrone, or a combination comprising at least one of the foregoing nitrones.

In another embodiment, the photochemically active dye is a nitrostilbene compound. Nitrostilbene compounds are illustrated by 4-dimethylamino-2',4'-dinitrostilbene, 4-dimethylamino-4'-cyano-2'-nitrostilbene, 4-hydroxy-2',4'-dinitrostilbene, and the like. The nitrostilbene can be a cis isomer, a trans isomer, or mixtures of the cis and trans isomers. Thus, in another embodiment, the photochemically active dye useful for producing a holographic data storage medium comprises at least one member selected from the group consisting of 4-dimethylamino-2',4'-dinitrostilbene, 4-dimethylamino-4'-cyano-2'-nitrostilbene, 4-hydroxy-2',4'-dinitrostilbene, 4-methoxy-2',4'-dinitrostilbene, α-(4-diethylaminophenyl)-N-phenylnitrone; α-(4-diethylaminophenyl)-N-(4-chlorophenyl)-nitrone, α-(4-diethylaminophenyl)-N-(3,4-dichlorophenyl)-nitrone, α-(4-diethylaminophenyl)-N-(4-carbethoxyphenyl)-nitrone, α-(4-diethylaminophenyl)-N-(4-acetylphenyl)-nitrone, α-(4-dimethylaminophenyl)-N-(4-cyanophenyl)-nitrone, α-(4-methoxyphenyl)-N-(4-cyanophenyl)nitrone, α-(9-julolidinyl)-N-phenylnitrone, α-(9-julolidinyl)-N-(4-chlorophenyl)nitrone, α-[2-(1,1-diphenylethenyl)]-N-phenylnitrone, and α-[2-(1-phenylpropenyl)]-N-phenylnitrone.

Upon exposure to electromagnetic radiation, nitrones undergo unimolecular cyclization to an oxaziridine illustrated by structure (X),

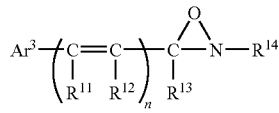
(X)

wherein $Ar^3$, $R^{11}$-$R^{14}$, and n have the same meaning as denoted above for the structure (IX).

The photochemically active dye is used in an amount from about 0.1 to about 10 weight percent in an embodiment, from about 1 weight percent to about 4 weight percent in another embodiment, and from about 4 weight percent to about 7 weight percent in still another embodiment, based on a total weight of the optically transparent substrate.

The optically transparent plastic materials used in producing the holographic data storage media can comprise any plastic material having sufficient optical quality, e.g., low scatter, low birefringence, and negligible losses at the wavelengths of interest, to render the data in the holographic storage material readable. Organic polymeric materials, such as for example, oligomers, polymers, dendrimers, ionomers, copolymers such as for example, block copolymers, random copolymers, graft copolymers, star block copolymers; or the like, or a combination comprising at least one of the foregoing polymers can be used. Thermoplastic polymers or thermosetting polymers can be used. Examples of suitable thermoplastic polymers include polyacrylates, polymethacrylates, polyamides, polyesters, polyolefins, polycarbonates, polystyrenes, polyesters, polyamideimides, polyarylates, polyarylsulfones, polyethersulfones, polyphenylene sulfides, polysulfones, polyimides, polyetherimides, polyetherketones, polyether etherketones, polyether ketone ketones, polysiloxanes, polyurethanes, polyarylene ethers, polyethers, polyether amides, polyether esters, or the like, or a combination comprising at least one of the foregoing thermoplastic polymers. Some more possible examples of suitable thermoplastic polymers include, but are not limited to, amorphous and semi-crystalline thermoplastic polymers and polymer blends, such as: polyvinyl chloride, linear and cyclic polyolefins, chlorinated polyethylene, polypropylene, and the like; hydrogenated polysulfones, ABS resins, hydrogenated polystyrenes, syndiotactic and atactic polystyrenes, polycyclohexyl ethylene, styrene-acrylonitrile copolymer, styrene-maleic anhydride copolymer, and the like; polybutadiene, polymethylmethacrylate (PMMA), methyl methacrylate-polyimide copolymers; polyacrylonitrile, polyacetals, polyphenylene ethers, including, but not limited to, those derived from 2,6-dimethylphenol and copolymers with 2,3, 6-trimethylphenol, and the like; ethylene-vinyl acetate copolymers, polyvinyl acetate, ethylene-tetrafluoroethylene copolymer, aromatic polyesters, polyvinyl fluoride, polyvinylidene fluoride, and polyvinylidene chloride.

In some embodiments, the thermoplastic polymer used in the methods disclosed herein as a substrate is made of a polycarbonate. The polycarbonate may be an aromatic polycarbonate, an aliphatic polycarbonate, or a polycarbonate comprising both aromatic and aliphatic structural units.

As used herein, the term "polycarbonate" includes compositions having structural units of the structure (XI),

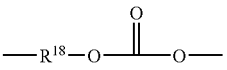
(XI)

where $R^{18}$ is an aliphatic, aromatic or a cycloaliphatic radical. In an embodiment, the polycarbonate comprises structural units of the structure (XII):

$$-A^1-Y^1-A^2- \quad (XII)$$

wherein each of $A^1$ and $A^2$ is a monocyclic divalent aryl radical and $Y^1$ is a bridging radical having zero, one, or two atoms which separate $A^1$ from $A^2$. In an exemplary embodiment, one atom separates $A^1$ from $A^2$. Illustrative, non-limiting examples of radicals of this type are —O—, —S—, —S(O)—, —S(O)$_2$—, —C(O)—, methylene, cyclohexylmethylene, 2-ethylidene, isopropylidene, neopentylidene, cyclohexylidene, cyclopentadecylidene, cyclododecylidene, adamantylidene, and the like. Structural units (XII) are typically derived from a bisphenol compound. Some examples of such bisphenol compounds are bis(hydroxyaryl)ethers such as 4,4'-dihydroxy diphenylether, 4,4'-dihydroxy-3,3'-dimethylphenyl ether, and the like; bis(hydroxy diaryl)sulfides, such as 4,4'-dihydroxy diphenyl sulfide, 4,4'-dihydroxy-3,3'-dimethyl diphenyl sulfide, and the like; bis(hydroxy diaryl)sulfoxides, such as, 4,4'-dihydroxy diphenyl sulfoxides, 4,4'-dihydroxy-3,3'-dimethyl diphenyl sulfoxides, and the like; bis(hydroxy diaryl)sulfones, such as 4,4'-dihydroxy diphenyl sulfone, 4,4'-dihydroxy-3,3'-dimethyl diphenyl sulfone, and the like; and combinations comprising at least one of the foregoing bisphenol compounds. In another embodiment, zero atoms separate $A^1$ from $A^2$, with an illustrative example being structural units derived from 4,4'-biphenol. The bridging radical $Y^1$ can be a hydrocarbon group, such as, for example, methylene, cyclohexylidene or isopropylidene, or aryl bridging groups.

A wide variety of dihydroxy aromatic compounds known in the art can be used to make polycarbonates suitable for use in the present invention. Examples of dihydroxy aromatic compounds include, for example, compounds having general structure (XIII),

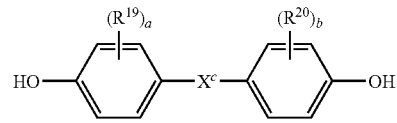
(XIII)

wherein $R^{19}$ and $R^{20}$ each independently represent a halogen atom, an aliphatic radical, an aromatic radical, or a cycloaliphatic radical; "a" and "b" are each independently integers from 0 a to 4; and $X^c$ represents one of the groups of represented by structure (XIV),

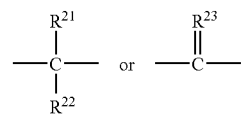
(XIV)

wherein $R^{21}$ and $R^{22}$ each independently represent a hydrogen atom or a aliphatic, aromatic or a cycloaliphatic radical;

and $R^{23}$ is a divalent hydrocarbon group. Some illustrative, non-limiting examples of suitable dihydroxy aromatic compounds include dihydric phenols and the dihydroxy-substituted aromatic hydrocarbons such as those disclosed by name or structure (generic or specific) in U.S. Pat. No. 4,217,438. Polycarbonates comprising structural units derived from bisphenol A are preferred since they are relatively inexpensive and commercially readily available. A nonexclusive list of specific examples of the types of bisphenol compounds that may be represented by structure (XIII) includes the following: 1,1-bis(4-hydroxyphenyl)methane; 1,1-bis(4-hydroxyphenyl)ethane; 2,2-bis(4-hydroxyphenyl)propane (hereinafter "bisphenol A" or "BPA"); 2,2-bis(4-hydroxyphenyl)butane; 2,2-bis(4-hydroxyphenyl)octane; 1,1-bis(4-hydroxyphenyl)propane; 1,1-bis(4-hydroxyphenyl)n-butane; bis(4-hydroxyphenyl)phenylmethane; 2,2-bis(4-hydroxy-3-methylphenyl)propane (hereinafter "DMBPA"); 1,1-bis(4-hydroxy-t-butylphenyl)propane; bis(hydroxyaryl)alkanes such as 2,2-bis(4-hydroxy-3-bromophenyl)propane; 1,1-bis(4-hydroxyphenyl)cyclopentane; 9,9-bis(4-hydroxyphenyl)fluorene; 9,9-bis(4-hydroxy-3-methylphenyl)fluorene; 4,4'-biphenol; and bis(hydroxyaryl)cycloalkanes such as 1,1-bis(4-hydroxyphenyl)cyclohexane and 1,1-bis(4-hydroxy-3-methylphenyl)cyclohexane (hereinafter "DMBPC"); and the like, as well as combinations comprising at least one of the foregoing bisphenol compound.

Polycarbonates can be produced by any of the methods known in the art. Branched polycarbonates are also useful, as well as blends of linear polycarbonates and branched polycarbonates. Preferred polycarbonates are based on bisphenol A. Preferably, the weight average molecular weight of the polycarbonate is about 5,000 to about 100,000 atomic mass units, more preferably about 10,000 to about 65,000 atomic mass units, and most preferably about 15,000 to about 35,000 atomic mass units. Other specific examples of a suitable thermoplastic polymer for use in forming the holographic data storage media include Lexan®, a polycarbonate; and Ultem®, an amorphous polyetherimide, both of which are commercially available from General Electric Company.

Examples of useful thermosetting polymers include those selected from the group consisting of a thermosetting epoxy, a thermosetting phenolic, a thermosetting polysiloxane, a thermosetting polyester, a thermosetting polyurethane, a thermosetting polyamide, a thermosetting polyacrylate, a thermosetting polymethacrylate, and a combination comprising at least one of the foregoing thermosetting polymers.

The photochemically active dye may be admixed with other additives to form a photo-active material. Examples of such additives include heat stabilizers, antioxidants, light stabilizers, plasticizers, antistatic agents, mold releasing agents, additional resins, binders, blowing agents, and the like, as well as combinations of the foregoing additives. The photo-active materials are used for manufacturing holographic data storage media.

Cycloaliphatic and aromatic polyesters can be used as binders for preparing the photo-active material. These are suitable for use with thermoplastic polymers, such as polycarbonates, to form the optically transparent substrate. These polyesters are optically transparent, and have improved weatherability, low water absorption and good melt compatibility with the polycarbonate matrix. Cycloaliphatic polyesters are generally prepared by reaction of a diol with a dibasic acid or an acid derivative, often in the presence of a suitable catalyst.

Generally, the polymers used for forming the optically transparent substrate, and the holographic data storage medium should be capable of withstanding the processing parameters, such as for example during the step of including the dye and application of any coating or subsequent layers and molding into final format; and subsequent storage conditions. Suitable thermoplastic polymers have glass transition temperatures of about 100° C. or greater in an embodiment, about 150° C. or greater in another embodiment, and about 200° C. or greater in still another embodiment. Exemplary thermoplastic polymers having glass transition temperatures of 200° C. or greater include certain types of polyetherimides, polyimides, and combinations comprising at least one of the foregoing.

As noted above, the effective photochemically active dye is present in an amount from about 0.1 to about 10 weight percent, based on the total weight of the optically transparent substrate, and has a UV-visible absorbance in a range between about 0.1 and about 1 at a wavelength in a range between about 300 nm and about 800 nm. Such photochemically active dyes are used in combination with other materials, such as, for example, binders to form photo-active materials, which in turn are used for manufacturing holographic data storage media. In an embodiment, a film of an optically transparent substrate comprising at least one optically transparent plastic material and at least one photochemically active dye is formed. Generally, the film is prepared by molding techniques by using a molding composition that is obtained by mixing the dye with an optically transparent plastic material. Mixing can be conducted in machines such as a single or multiple screw extruder, a Buss kneader, a Henschel, a helicone, an Eirich mixer, a Ross mixer, a Banbury mixer, a roll mill, molding machines such as injection molding machines, vacuum forming machines, blow molding machines, or the like, or a combination comprising at least one of the foregoing machines. Alternatively, the dye and the optically transparent plastic material may be dissolved in a solution and films of the optically transparent substrate can be spin cast from the solution.

After the mixing step, the data storage composition is injection molded into an article that can be used for producing holographic data storage media. The injection-molded article can have any geometry. Examples of suitable geometries include circular discs, square shaped plates, polygonal shapes, and the like. The thickness of the articles can vary, from at least 100 micrometers in an embodiment, to at least 250 micrometers in another embodiment. A thickness of at least 250 micrometers is useful in producing holographic data storage disks which are comparable to the thickness of current digital storage discs.

The molded data storage medium thus produced can be used for producing data storage articles, which can be used for storing data in the form of holograms. The data storage medium in the data storage article is irradiated with electromagnetic energy having a first wavelength to form a modified optically transparent substrate comprising at least one optically readable datum and at least one photo-product of the photochemically active dye. The resulting holographic data storage medium has the photo-product patterned within the optically transparent substrate to provide at least one optically readable datum. In one embodiment, the irradiation facilitates a partial chemical conversion (also sometimes referred to as "reaction") of the photochemically active dye to a photo-product, for example, the cyclization reaction of the vicinal diarylethene to a cyclized product, or the ring opening reaction of the cyclized product to the vicinal diarylethene product, or conversion of an aryl nitrone to an aryl oxaziridine product; or a decomposition product derived from the oxaziridine, thereby creating a hologram of the at least one optically readable datum.

Reading of the stored holographic data can be achieved by a read beam, which comprises irradiating the data storage medium with electromagnetic energy. The read beam reads the data contained by diffracted light from the hologram. In an embodiment, the read wavelength can be between 350 and 1,100 nanometers (nm). In one embodiment, the wavelengths of the data beam used for writing the data as holograms and the read beam used for reading the stored data are the same. In another embodiment, the wavelengths of the data beam and the read beam are different from each other, and can independently have a wavelength between 350 and 1,100 nanometers. In still another embodiment, the read beam has a wavelength that is shifted by 0 nm to about 400 nm from the wavelength of the write beam.

The methods disclosed herein can be used for producing holographic data storage media that can be used for bit-wise type data storage in an embodiment, and page-wise type storage of data in another embodiment. In still another embodiment, the methods can be used for storing data in multiple layers of the data storage medium.

The holographic data storage articles described hereinabove are useful for recording data in the form of holograms and reading the holographic data. The holographic data storage medium in the in the holographic data storage article is irradiated with electromagnetic energy having a first wavelength (the signal beam or the write beam) having data to be written. This leads to the formation of a modified optically transparent substrate comprising at least one photo-product of the at least one photochemically active dye (described previously), and at least one optically readable datum. The data is then stored in the data storage medium as a hologram. Then the holographic data storage medium is irradiated with electromagnetic energy having a second wavelength (the read beam) to read the hologram. In an embodiment, the read beam has a wavelength that is shifted by 0 nanometer to about 400 nanometers from the signal beam's wavelength.

In one embodiment, the method of the present invention employs a polymeric photochemically active dye. The polymeric photochemically active dye comprises at least one structural unit susceptible to photochemical transformation into a photo-product. In some embodiments, the polymeric photochemically active dye comprises the photochemically active dye as part of the main chain repeat units. In other embodiments, the polymeric photochemical dye comprises photochemically active dyes present as end cappers, or end groups. In one embodiment, the polymeric photochemically active dye comprises structural units derived from dihydroxy aromatic compound XV

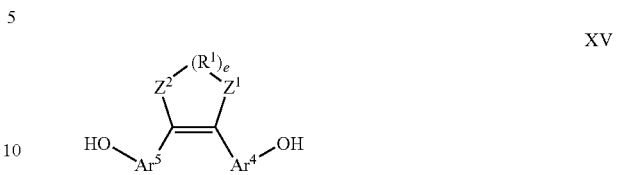

XV wherein $R^1$, "e", $Z^1$, and $Z^2$ are defined as in structure (I) and $Ar^4$ and $Ar^5$ are each independently a $C_2$-$C_{40}$ aromatic radical. Polymers comprising structural units derived from dihydroxy aromatic compounds XV include, but are not limited to, polyethers, polyesters, polycarbonates, polyestercarbonates, and combinations thereof. In exemplary embodiments, $Ar^4$ and $Ar^5$ are independently selected from the group consisting of divalent aromatic radicals XVII, XVIII, and XIX

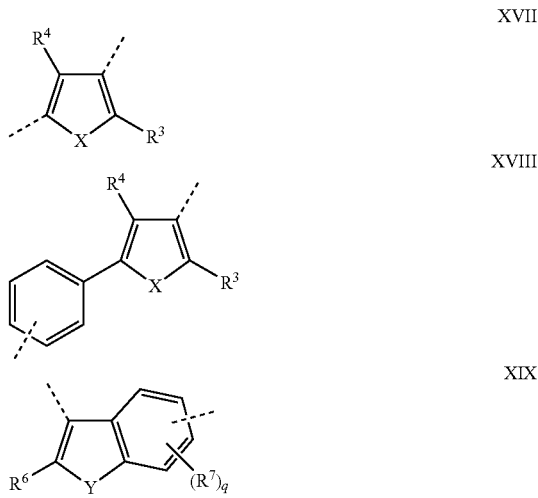

XVII

XVIII

XIX wherein $R^3$, $R^4$ and X are defined as in structure (II), and $R^6$, $R^7$ and Y are defined as in structure (III); and "q" is a number ranging from 0 to 3. Table II provides examples of dihydroxy aromatic photochemically active compounds encompassed by generic structure (XV).

TABLE II

Dihydroxy Aromatic Photochemically Active Compounds represented by generic structure XV

| Entry # | Structure | $Ar^4$ & $Ar^5$ | $Z^1$ & $Z^2$ | $R^1$ | e |
|---------|-----------|-----------------|---------------|-------|---|
| II-1 | | | $CF_2$ | $CF_2$ | 1 |

TABLE II-continued

Dihydroxy Aromatic Photochemically Active Compounds represented by generic structure XV

| Entry # | Structure | $Ar^4$ & $Ar^5$ | $Z^1$ & $Z^2$ | $R^1$ | e |
|---|---|---|---|---|---|
| II-2 | | | $CH_2$ | $CH_2$ | 1 |
| II-3 | | | $CH_2$ | $CH_2$ | 1 |
| II-4 | | | $CF_2$ | $CF_2$ | 1 |

In Table II, ------ represents the point of attachment of the Ar units to the cyclic ethene unit, while ∿∿ represents the point of attachment of the Ar units to the hydroxyl functional groups.

In another embodiment, the photochemically active dye comprises a polymer that is end capped with a photochemically active dye and comprise structural units derived from a monohydroxy aromatic compound XVI

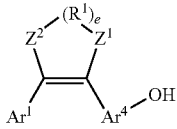

XVI wherein $Ar^1$, $R^1$, "e", $Z^1$ and $Z^2$ are defined as in structure (I); and $Ar^4$ is defined as in structure (XV). In one embodiment, $Ar^4$ is selected from the group consisting of divalent aromatic radicals XVII, XVIII and XIX. In an embodiment, $Ar^1$ is selected from the group consisting of structures II, III, and IV. In yet another embodiment, $Ar^1$ is selected from the group consisting of a phenyl, an anthracenyl, a phenanthrenyl, a pyridinyl, a pyridazinyl, a 1H-phenalenyl, a naphthyl, and substituted derivatives thereof. Table III provides examples of photochemically active dye molecules (XVI).

TABLE III

Monohydroxy Aromatic Photochemically Active Compounds represented by generic structure XVI

| Entry # | Structure | $Ar^4$ | $Ar^1$ | $Z^1$ & $Z^2$ | $R^1$ | e |
|---|---|---|---|---|---|---|
| III-1 | | | | $CF_2$ | $CF_2$ | 1 |

TABLE III-continued

Monohydroxy Aromatic Photochemically Active Compounds represented by generic structure XVI

| Entry # | Structure | $Ar^4$ | $Ar^1$ | $Z^1$ & $Z^2$ | $R^1$ | e |
|---|---|---|---|---|---|---|
| III-2 | | | | $CH_2$ | $CH_2$ | 1 |
| III-3 | | | | $CH_2$ | $CH_2$ | 1 |

In Table III, ------ represents the point of attachment of the Ar units to the cyclic ethene unit, while ∿∿ represents the point of attachment of the Ar units to the hydroxyl functional groups.

In some embodiments, the polymeric photochemical dye comprises structural units derived from compounds XV and XVI. In such instances, polymeric photochemically active dye comprises photochemically active units as part of main chain repeat units, as well as part of the end groups. In one illustrative embodiment, the polymeric photochemically active dye comprises structural units derived from compound II-1, that is end capped with end capping agent III-2, and in another illustrative embodiment, the polymeric photochemically active dye comprises structural units derived from compound II-4, that is end capped with end capping agent III-1.

The polymeric photochemically active dye may further comprise structural units derived from dihydroxy aromatic compound XX

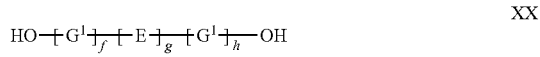

XX wherein each $G^1$ is independently at each occurrence a $C_6$-$C_{20}$ aromatic radical; E is independently at each occurrence a bond, a $C_3$-$C_{20}$ cycloaliphatic radical, a $C_6$-$C_{20}$ aromatic radical, a $C_1$-$C_{20}$ aliphatic radical, a sulfur atom, a selenium atom, or an oxygen atom; "f" is a number greater than or equal to one; "g" is either zero or one; and "h" is a whole number including zero. Exemplary dihydroxyl compounds from which structural units XX may be derived from include, but are not limited to 4,4'-oxydiphenol; 2,2-bis(4-hydroxyphenyl)propane; 1,1,1,3,3,3-hexafluoro-2,2-bis(4-hydroxyphenyl)propane; 4,4'-biphenol; bis(4-hydroxyphenyl)sulfide; bis(4-hydroxyphenyl)sulfone; 9,9-bis(4-hydroxyphenyl)fluorene; 1,1-bis(4-hydroxyphenyl) cyclohexylmethane; hydroquinone; methyl hydroquinone; resorcinol; 3-(4-hydroxyphenyl)-1,1,3-trimethylindan-5-ol; 2,2,2',2'-tetrahydro-3,3,3',3'-tetramethyl-1,1'-spirobi(1H-indene)-6,6'-diol; and the like; and combinations thereof.

In one embodiment, the hydroxyl group on the monomer may be reacted with a carboxylic acid or a carboxylic acid ester or a carboxylic acid anhydride or a carboxylic acid chloride to form a polyester. In an alternate embodiment, the hydroxyl group is converted to the corresponding salt and then reacted with a comonomer comprising a reactive aryl halide to form a polyether.

The dihydroxy aromatic compounds XV and XX may be converted to polymers, for example polycarbonates, copolycarbonates, polyarylates, copolyarylates, copolyestercarbonates, polyethers, polyether sulfones, and polyether imides, by means of the aromatic hydroxyl groups. For example, the monomers may be polymerized under interfacial conditions with phosgene to provide a copolycarbonate comprising structural units derived from said monomers and phosgene. Interfacial conditions are illustrated by reactions commonly employed to make bisphenol A polycarbonate, namely reaction at or near ambient temperature of a dihydroxy aromatic compound with phosgene in a mixture of water and a water immiscible solvent such as methylene chloride in the presence of a water soluble base (e.g. sodium hydroxide) and a catalyst such as triethylamine. In one embodiment, the present invention provides a polymer prepared by reaction of a monomer selected from the group consisting of monomers having formula XV (e.g. monomer II-1), under interfacial conditions with a comonomer (for example a bisphenol such as bisphenol A) to provide a photochemically active copolycarbonate comprising structural units susceptible to photochemical transformation (i.e. structural units derived from monomer II-1) and structural units derived from the comonomer. In an alternate embodiment, the present invention provides a photochemically active polymer prepared by reaction of a photochemically active monomer selected from the group consisting of monomers having formula XV (e.g. monomers II-2 and monomers II-4), under melt polymerization conditions with a diaryl carbonate (e.g. bis(methyl salicyl)carbonate. Melt polymerization conditions are illustrated by reaction conditions typically employed when reacting a bisphenol (e.g. bisphenol A) with a diaryl carbonate (e.g. diphenyl carbonate) in the presence of a minute amount of a basic catalyst such as sodium hydroxide at a temperature in a range between about 150 and 300° C. at subatmospheric pressure. In yet another embodiment, the present invention provides a photochemically active polymer comprising structural units derived from a photochemically active monomer having formula XV (e.g. monomer II-3), by reacting a monomer having structural units XV under interfacial conditions with a bishaloformate, for example bisphenol A bischloroformate, to provide a photochemically active polycarbonate comprising structural units derived from the photochemically active monomer and bisphenol A bischlroformate.

In another embodiment wherein the polymeric photochemically active dye is a polyester, the dihydroxy aromatic photochemically active compounds may be reacted with a comonomer which is a carboxylate ester, a carboxylic anhydride, or a carboxylic acid halide under melt or interfacial polymerization conditions as appropriate.

In one embodiment, the present invention provides a polymeric photochemically active dye which is a polyether sulfone. Such photochemically active polyethersulfones may be prepared for example, by reacting the disodium salt of the photochemically active monomer having formula II-1 together with the disodium salt of bisphenol A may with bis(4-chlorophenyl)sulfone in orthodichlorobenzene at a temperature between about 100 and about 250° C. in the presence of a phase transfer catalyst such as hexaethyl guanidinium chloride.

Reaction conditions useful for the preparation of the polymeric photochemically active dye compositions provided by the present invention include the use of polar solvents and bases of suitable strength. Exemplary solvents include chloroform, methylene chloride, orthodichlorobenzene, veratrole, anisole, and the like, and combinations thereof. Exemplary bases include triethylamine, sodium hydroxide, potassium hydroxide, and the like, and combinations thereof. Suitable catalysts may also be employed to effect the polymerization reaction.

In certain embodiments, the polymerization reaction may be conducted at a suitable temperature that ranges from about room temperature to about the boiling point of the solvent of choice. The polymerization may also be conducted at atmospheric pressure, subatmospheric pressures, or superatmospheric pressures. The polymerization reaction is conducted for a time period necessary to obtain the polymeric photochemically active dye of a suitable molecular weight. The molecular weight of a polymer may be determined by any of the techniques known to those skilled in the art, which techniques include viscosity measurements, light scattering, osmometry, and the like. The molecular weight of a polymer is typically represented as a number average molecular weight $M_n$, or weight average molecular weight, $M_w$. A particularly useful technique to determine polymer molecular weights is gel permeation chromatography (GPC), from wherein both number average and weight average molecular weights are obtained. In some embodiments, polymers of $M_w$, greater than 2,000 grams per mole (g/mol) is desirable, in other embodiments, polymers of $M_w$ greater than 10,000 g/mol is desirable, while in yet other embodiments, polymer of $M_w$ greater than 30,000 g/mol is desirable.

In various embodiments, the polymeric photochemically active dye is prepared in a polymerization reaction wherein the molecular weight of the product polymeric photochemically active dye is controlled by the addition of a suitable monofunctional reactant, sometimes also referred to in the art as an "end-capping agent", or "chain stopper". Suitable photochemically active end-capping agents are shown in Table III. Other suitable phenolic chain stoppers include phenol, p-cumylphenol, and the like.

The polymeric photochemically active dyes provided by the present invention may be isolated and purified by techniques known in the art. Techniques to be used depend at least in part on the identity of the polymer, and the solvents, monomers, and catalysts employed in the preparation of the photochemically active polymer. In one embodiment, the product mixture is obtained from a polymerization reaction as a solution comprising the product polymer, residual monomers, by-products, and catalyst. This solution may be added dropwise to a solvent which dissolves residual monomers, byproducts, and catalyst from the polymerization reaction, but in which the product polymer is insoluble. Such solvents may be referred to as a nonsolvents for the polymer, or simply as a nonsolvents. Subsequently, the polymer may be isolated by solid separation techniques known in the art, which include filtration, Mott filtration, centrifugation, decantation, like techniques, and combinations thereof. The isolated polymer may then be dissolved in a solvent and precipitated out of a nonsolvent as many times as deemed necessary by the practitioner to obtain a desired level of polymer purity. The polymer may be dried under vacuum, with or without the application of heat.

In some embodiments, the polymeric photochemically active dye is obtained from the one or more purification steps as a solution which may be used in further applications, for example in the preparation of a cast film. Polymeric photochemically active dye films may be obtained by casting the solution comprising polymeric photochemically active dye onto a suitable substrate and allowing the solvent to evaporate. Subsequently, depending on the application, the film may be removed from the substrate, or may be used in combination with the substrate. In certain embodiments films are prepared by spin casting a solution of the polymeric photochemically active dye onto a suitable substrate.

In particular embodiments, the polymeric photochemically active dye is first isolated as a solid and then melt extruded to provide a stand alone film. In other embodiments, the solid polymer may be compression molded at suitable temperatures and pressures to obtain a film of desired thickness. Other techniques for film formation are known in the art, and may be used here. In one embodiment, the present invention provides a polymeric photochemically active dye composition comprising structural units of formula XXI

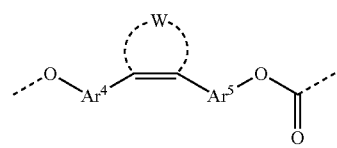

XXI wherein W is a divalent $C_2$-$C_{20}$ aliphatic radical, a $C_3$-$C_{50}$ aromatic radical, or a $C_3$-$C_{50}$ cycloaliphatic radical; and $Ar^4$ and $Ar^5$ are defined as in structure (XV). Exemplary monomers that may be used to obtain the polymeric photochemically active dye having structural units XXI are listed in Table II.

In a specific embodiment, the invention provides a polymeric photochemically active dye composition comprising structural units XXII.

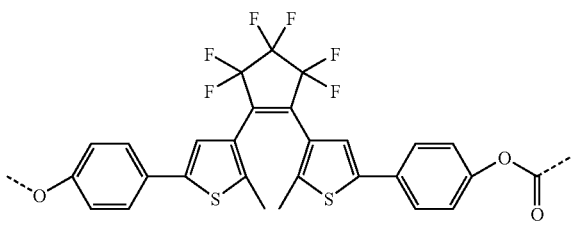

(XXII)

EXAMPLES

Example 1

Preparation of 4'-methoxy-2,4-dinitrostilbene. To a 2 liter 3-necked round-bottomed flask equipped with a condenser, a Dean-Stark trap, a mechanical stirrer, nitrogen inlet, heating mantle, thermometer, and a Therm-o-watch® temperature controller, was added p-anisaldehyde (149.8 grams, 1.1 moles), 2,4-dinitrotoluene (182 grams, 1.0 mole), xylene (500 milliliters), and piperidine (50 milliliters, 0.5 mole). The resulting mixture was heated with the temperature on the Therm-o-watch® temperature controller set at 145° C. After stirring and heating for about 2 hours, approximately 20 milliliters of water had collected in the Dean-Stark trap. The reaction solution was allowed to cool to room temperature, and then further cooled with an ice water bath for an additional hour during which time the desired product crystallized from the solution. The solid material was filtered, rinsed with pentane, and dried in a vacuum oven at 100° C. for 12 hours to give 257.1 grams (85.6 percent of theory) of the desired product as a dark red crystalline solid.

Example 2

Preparation of α-(4-Dimethylamino)styryl-N-phenyl nitrone. To a 1-liter, 3-necked round-bottomed flask equipped with a mechanical stirrer and a nitrogen inlet was added phenylhydroxyamine (27.3 grams, 0.25 mole), (4-dimethylamino)cinnamaldehyde (43.81 grams, 0.25 mole), and ethanol (250 milliliters). To the resulting bright orange slurry was added methanesulfonic acid (250 microliters) via a syringe. The bright orange slurry turned to a deep red and all solids dissolved. Within five minutes, an orange solid formed. Pentane (about 300 milliliters) was added to facilitate stirring of the reaction mixture. The solid was filtered and dried in a vacuum oven at 80° C. for several hours to give 55.9 grams (84 percent of theory) of the desired product as a bright orange solid. The dye has structure (XXIII):

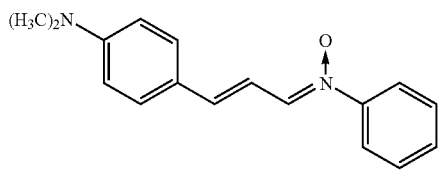

(XXIII)

Example 3

Preparation of α-Styryl-N-phenyl nitrone. N-Isopropylhydroxylamine hydrochloride (5.04 grams, 45.2 millimoles, 1 molar equivalent; available from Acros Organics) was combined with trans-cinnamaldehyde (5.66 grams, 42.9 millimoles, 0.95 molar equivalent; available from Aldrich Chemical Company) in 16 milliliters of water. The rapidly stirred mixture started off as an emulsion due to the low solubility of the trans-cinnamaldehyde. After about one hour, the emulsion disappeared, and a homogeneous light yellow solution resulted. After being stirred for four hours, the reaction mixture was poured into methylene chloride and treated with 26 milliliters of saturated aqueous sodium carbonate solution (containing greater than 2 molar equivalents of sodium carbonate base to insure consumption of hydrogen chloride byproduct) such that the pH was about 10.5. The phases were separated and the aqueous phase was rinsed with additional methylene chloride. The combined organic phase was separated, dried over anhydrous magnesium sulfate, concentrated in vacuo, and dried under vacuum overnight to produce 7.4 grams (91 percent of theory) of the desired product that was determined to be pure by liquid chromatography and further characterized by NMR spectroscopy. UV-visible spectrum of the product in absolute ethanol revealed an absorption maximum ($\lambda_{max}$) at 330 nanometers. Exposure of this dilute solution to a 390 nanometer light source converted the nitrone to the corresponding oxaziradine with a shift of the absorption maximum to 256 nanometers. All sample manipulations were done in a dark room containing only red light to insure the stability of α-styryl-N-phenyl nitrone. The dye has structure (XXIV):

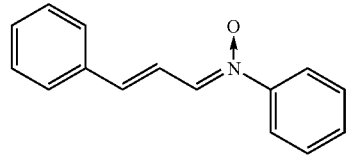

(XXIV)

Example 4

This Example describes the procedure for preparing a α-(4-Dimethylamino)styryl-N-phenyl Nitrone—Polystyrene blend, which was subsequently used for preparing molded disks having a thickness of about 1.2 millimeters.

Ten kilograms of crystal polystyrene 1301 pellets (obtained from Nova Chemicals) were ground to a coarse powder in a Retsch mill and dried in a circulating air oven maintained at 80° C. for several hours. In a 10-liter Henschel mixer, 6.5 kilograms of the dry polystyrene powder and 195 grams of α-(4-dimethylamino)styryl-N-phenyl nitrone were blended to form a homogeneous orange powder. The powder blend was then fed to a WP 28 millimeter twin-screw extruder at 185° C. to give 6.2 kilograms of dark orange pellets with a nominal dye content of about 3 weight percent. This material was then further diluted with additional crystal polystyrene 1301 pellets to make blends having 0.60 weight percent, 0.75 weight percent, 1 weight percent, and 1.24 weight percent of α-(4-dimethylamino)styryl-N-phenyl nitrone. Each of these four diluted blend compositions was re-processed with the WP 28 millimeter twin-screw extruder to form homogeneously colored pellets.

Optical quality disks were prepared by injection molding the four diluted blends (prepared as described above) with an ELECTRA DISCO™ 50-ton all-electrical commercial CD/DVD (compact disc/digital video disc) molding machine (available from Milacron Inc.). Mirrored stampers were used for both surfaces. Cycle times were generally set to about 10 seconds. Molding conditions were varied depending upon the glass transition temperature and melt viscosity of the polymer used, as well as the photochemically active dye's thermal stability. Thus the maximum barrel temperature was varied from about 200° C. to about 375° C.

Example 5

Procedures for preparing molded disks using the Minijector®. The molding conditions varied depending upon the nature of the polymer matrix used to incorporate the photochemically active dye. Typical conditions used for molding OQ (Optical Grade) polycarbonate and polystyrene based blends of the photochemically active dyes are shown in Table IV.

TABLE IV

| Molding Parameters | OQ Polycarbonate Powder | Polystyrene Powder |
|---|---|---|
| Barrel Temp. (Rear) (° F.) | 500 | 400 |
| Barrel Temp. (Front) (° F.) | 540 | 395 |
| Barrel Temp. (Nozzle) (° F.) | 540 | 395 |
| Mold Temp. (° F.) | 200 | 100 |
| Total Cycle Time (sec) | 35 | 25 |
| Switch Point (inch) | 0.7 | 0.7 |
| Injection Transition (inch) | 0.22 | 0.22 |
| Injection Boost Press. (psi) | 950 | 850 |
| Injection Hold Press. (psi) | 300 | 250 |

Example 6

Procedure for measuring UV-visible spectra of the photochemically active dyes. All spectra were recorded on a Cary/Varian 300 UV-visible spectrophotometer using injection-molded disks having a thickness of about 1.2 millimeters. Spectra were recorded in the range of 300 nanometers to 800 nanometers. Due to disk-to-disk variations, no reference sample was used. Results of the UV-visible absorption spectra measurements are shown in Table 2 as Examples 7-11.

The absorption reported in the table was calculated by subtracting the average baseline in the range of 700-800 nanometers for each sample tested from the measured absorption at either 405 nanometers or 532 nanometers. Since these compounds do not absorb in the 700-800 nanometer range, this correction removed the apparent absorption caused by reflections off the surfaces of the disk and provided a more accurate representation of the absorbance of the dye. The polymers used in these examples had little or no absorption at 405 nanometers or 532 nanometers.

Examples 7-10 used α-(4-Dimethylamino)styryl-N-phenyl nitrone as the photochemically active dye, and Example 11 used α-styryl-N-phenyl nitrone.

TABLE V

| Example Number | Photo-chemically Active Dye Structure | Dye concentration (weight percent) | Observation Wavelength (nanometers) | Absorbance at observation wavelength | M# |
|---|---|---|---|---|---|
| 7 | XXIII | 0.6 | 532 | 0.33 | 0.66 |
| 8 | XXIII | 0.75 | 532 | 0.42 | 0.86 |
| 9 | XXIII | 1 | 532 | 0.57 | 1.01 |
| 10 | XXIII | 1.24 | 532 | 0.7 | 1.28 |
| 11 | XXIV | 2.9 | 405 | 0.58 | 2.5 |

The data in Table V shows that an M# of 0.5 or higher can be achieved by using from about 0.1 to about 10 weight percent of a dye, based on a total weight of the optically transparent substrate, wherein the photochemically active dye has a UV-visible absorbance in a range from about 0.1 to about 1 at a wavelength in a range from about 300 nanometers to about 800 nanometers. The results also show that high volumetric data storage capacities can be achieved using photochemically active dyes that are efficient and sensitive to electromagnetic energy, such as light without interference from the main absorption peak of the dye.

Example 12

All the polymerization reactions were conducted in a room that is illuminated with red lights. Diarylethene, 1,2-bis[5'(4"-hydroxyphenyl)-2'-methylthien-3'-yl]perfluorocyclopentene, was synthesized according to the procedure described in Kawai et al., Chem. Eur. J., Vol. 1, No. 5, pp. 285-293, 1995. A 25 ml flask was charged Bisphenol A bis (chloroformate) (250 milligrams (mg), 0.672 mmoles), of diarylethene (11.1 mg, 0.03 equivalents (eq.) with respect to bisphenol A bis(chloroformate)), p-cumylphenol (4.3 mg, 0.03 eq.), and methylene chloride ($CH_2Cl_2$) (5 milliliters (ml)). After several minutes of stirring, a slightly cloudy but homogeneous solution formed. Then, water (2 ml), potassium bicarbonate ($K_2CO_3$) (232 mg, 2.5 eq) and a 75 weight % aqueous solution of methyltributylammonium chloride (11 microliters (μl) (0.05 eq.)) were added to the reaction mixture and the interfacial mixture was rapidly stirred. The reaction mixture was tested for the presence or absence of chloroformates using a phosgene paper test, as described previously in U.S. Pat. No. 5,391,692. After 20 minutes of stirring, the reaction mixture gave a positive response to the presence of chloroformate. At this point, a previously prepared 10 volume % solution of triethylamine in $CH_2Cl_2$ (30 μL (0.03 eq)) was slowly added to the rapidly stirring reaction mixture. Within a few minutes, phosgene paper test indicated that most of the chloroformate was consumed. After 2 hours, all of the chloroformate had been consumed and the stirring was stopped. An equivolume mixture of $CH_2Cl_2$ and water (10 ml) was added to the reaction mixture and the aqueous phase was collected separately. The organic phase was washed once with 10 weight % sodium hydroxide, twice with 1 Normal (N) hydrochloric acid, and 3 times with water until nearly neutral pH was achieved. The organic phase was concentrated under reduced pressure to yield 157 mg of a light yellow solid at 91% yield.

Comparative Example 1

The procedure described in Example 12 was followed here, using the same equivalents of each reagent, but in the absence of the diarylethene.

Example 12 taken together with Comparative Example 1 illustrates both that the diarylethene monomer, 1,2-bis[5'(4"-hydroxyphenyl)-2'-methylthien-3'-yl]perfluorocyclopentene, was incorporated into the copolycarbonate, and that a uniform distribution of structural units derived from the diarylethene monomer it in the product copolycarbonate (i.e. not just in the high or low MW fractions of the polymer) was achieved. Solutions of the product copolycarbonate of Example 12 and of the polycarbonate control sample of Comparative Example 1 were prepared in chloroform at concentrations of 3 mg/ml. Some of this solution was diluted by a factor of 2 and used for solution UV-Vis in 1 cm cells (See Example 13 below).

Comparative Example 2

A solution was prepared from a commercially available bisphenol A polycarbonate in chloroform.

Example 13

UV-Visible Spectroscopic Studies of the Copolycarbonate of Example 12

UV-Visible spectroscopic studies were performed on Varian Cary 300 Scan" UV-Vis spectrometer. The polymer solution in chloroform at a concentration of 1.5 milligrams per milliliters showed strong absorption characteristics up to about 350 nanometers (nm), but had little or no absorbance at about 420 nm. Upon exposure of the polymer solution to a 380 nm 100 milliwatt (mW) light source for about 1 minute, the solution turned blue. The UV-Visible spectra of the exposed solution showed a broad absorbance that had a lambda max at 585 nm and an absorbance of 0.61. This indicated the dye was incorporated into the polymer and had not been extracted as the phenolates in the base washes.

Example 14

GPC Studies of the Polymers

GPC at 2 different wavelengths was used to confirm that the dye was uniformly distributed in the polymer matrix. The conditions for GPC were as follows: chloroform was used as the eluent, maintained at a flow rate of 1 milliliter per minute (mL/min), and the detector was a PDA Diode Array UV detector set at two different wavelengths 254 nm and 300 nm. The weight average molecular weight $M_w$ reported here was estimated based on polystyrene standards. The ratio of the area under the peaks for 254 nm and 300 nm on the GPC chromatograms are shown in Table VI.

TABLE VI

GPC Data for the polymers

| Sample | $M_w$ of polymers | Ratio of area under the peaks for 254 and 300 nm |
|---|---|---|
| Example 12 | 12,100 | 1.3 |
| Comparative Example 1 | 11,400 | ~20 |
| Comparative Example 2 | 18,500 | >240 |

Table 5 shows that at similar weight average molecular weights, the homopolycarbonate based on bisphenol A of Comparative Example 1 and the commercial Optical Quality polycarbonate of Comparative Example 2 gave a large ratio of area under the peaks for 254 nm and 300 nm. This is due to little or no absorption at 300 nm by those polymers. The polymer from Comparative Example 1 had a minimal absorption at 300 nm, which is attributed to the light yellow color of the polymer itself. The polymer from Example 12 showed a very strong response at 300 nm at only 3 weight % loading of the dye. The chromatogram obtained at 300 nm was superimposable on the chromatogram obtained at 254 nm, which indicated that the dye was evenly distributed and was not confined to either the low or high molecular weight fractions.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

The invention claimed is:

1. A method of making a holographic data storage medium, said method comprising:
    (a) providing an optically transparent substrate comprising at least one photochemically active polymeric diarylethene dye based upon polycarbonate; and
    (b) irradiating the optically transparent substrate at least one wavelength at which the optically transparent substrate has an absorbance in a range from about 0.1 to 1, said at least one wavelength being in a range from about 300 nanometers to about 800 nanometers, to produce a modified optically transparent substrate comprising at least one optically readable datum and at least one photo-product of the photochemically active polymeric diarylethene dye based upon polycarbonate, wherein the optically transparent substrate is at least 100 micrometers thick and comprises the photochemically active dye in an amount corresponding to from about 0.1 to about 10 weight percent based on a total weight of the optically transparent substrate.

2. The method of claim 1, wherein said at least one optically readable datum comprises at least one volume element having a refractive index which is different from a corresponding volume element of the optically transparent substrate, said volume element being characterized by a change in refractive index relative to the refractive index of the corresponding volume element prior to irradiation.

3. The method of claim 1, wherein the data storage medium has a data storage capacity, as measured by M/# of greater than 0.5.

4. The method of claim 1, wherein the at least one photo-product is patterned within the modified optically transparent substrate to provide the at least one optically readable datum.

5. The method of claim 1, wherein the optically transparent substrate comprises a thermoplastic polymer, a thermosetting polymer, or a combination of a thermoplastic polymer and a thermosetting polymer.

6. The method of claim 5, wherein the thermoplastic polymer is selected from the group consisting of polyacrylates, polymethacrylates, polyesters, polyolefins, polycarbonates, polystyrenes, polyesters, polyamides, polyamideimides, polyarylates, polyarylsulfones, polyethersulfones, polyphenylene sulfides, polysulfones, polyimides, polyetherimides, polyetherketones, polyether etherketones, polyether ketone ketones, polysiloxanes, polyurethanes, polyethers, polyarylene ethers, polyether amides, polyether esters, or a combination comprising at least one of the foregoing thermoplastic polymers.

7. The method of claim 5, wherein the thermosetting polymer is selected from the group consisting of an epoxy thermosetting polymer, a phenolic thermosetting polymer, a polysiloxane thermosetting polymer, a polyester thermosetting polymer, a polyurethane thermosetting polymer, a polyamide thermosetting polymer, a polyacrylate thermosetting polymer, a polymethacrylate thermosetting polymer, or a combination comprising at least one of the foregoing thermosetting polymers.

8. The method of claim 5, wherein the thermoplastic polymer comprises a polycarbonate comprising structural units derived from bisphenol A.

9. The method of claim 1, wherein the at least one photoproduct comprises a photo-decomposition product of the at least one photochemically active dye.

10. The method of claim 1, wherein the at least one photoproduct comprises a molecular rearrangement product of the at least one photochemically active dye.

11. An optical writing and reading method, comprising:
irradiating a holographic data storage medium with a signal beam possessing data and a reference beam simultaneously to partly convert a photochemically active polymeric diarylethene dye based upon polycarbonate into at least one photo-product and store the data in the signal beam as a hologram in the holographic data storage medium; the holographic storage medium comprising an optically transparent substrate and at least one photochemically active polymeric diarylethene dye based upon polycarbonate; the optically transparent substrate having a thickness of at least 100 micrometers, and comprising the photochemically active dye in an amount corresponding to from about 0.1 to about 10 weight percent based on a total weight of the optically transparent substrate, and having a UV-visible absorbance in a range from about 0.1 to 1 at least one wavelength in a range from about 300 nanometers to about 800 nanometers; and
irradiating the holographic storage medium with a read beam and reading the data contained by diffracted light from the hologram.

12. The method of claim 11, wherein the read beam has a wavelength that is shifted by 0 nanometers to about 400 nanometers from the signal beam's wavelength.

13. A method for using a holographic data storage article, the method comprising the steps of:
irradiating a holographic data storage medium in the holographic data storage article with electromagnetic energy having a first wavelength, the holographic data storage medium comprising an optically transparent substrate that is at least 100 micrometers thick and comprising at least one photochemically active polymeric diarylethene dye based upon polycarbonate wherein the dye is present in an amount corresponding to from about 0.1 to about 10 weight percent based on a total weight of the optically transparent substrate, said irradiating being done at least one wavelength at which the optically transparent substrate has an absorbance in a range from about 0.1 to 1, and said at least one wavelength being in a range from about 300 nanometers to about 800 nanometers;
forming a modified optically transparent substrate comprising at least one photo-product of the at least one photochemically active polymeric diarylethene dye based upon polycarbonate, and at least one optically readable datum stored as a hologram; and
irradiating the holographic data storage medium in the article with electromagnetic energy having a second wavelength to read the hologram.

14. The method of claim 13, wherein the second wavelength is shifted by 0 nanometer to about 400 nanometers from the first wavelength.

15. The method of claim 13, wherein the first wavelength is not the same as the second wavelength.

16. The method of claim 13, wherein the first wavelength is the same as the second wavelength.

17. A method of manufacturing a holographic data storage medium, the method comprising:
forming a film of an optically transparent substrate comprising at least one optically transparent plastic material, and at least one photochemically active polymeric diarylethene dye based upon polycarbonate, wherein the optically transparent substrate is at least 100 micrometers thick and comprises the photochemically active dye in an amount corresponding to from about 0.1 to about 10 weight percent based on a total weight of the optically transparent substrate, and wherein the optically transparent substrate has a UV-visible absorbance in a range from about 0.1 to 1 at least one wavelength in a range from about 300 nanometers to about 800 nanometers.

18. The method of claim 17, wherein the film of the optically transparent substrate is formed by a molding technique.

19. The method of claim 17, wherein the film of the optically transparent substrate is formed by a spin casting technique.

20. The method of claim 17, wherein the at least one optically transparent plastic material comprises a thermoplastic polymer, a thermosetting polymer, or a combination of a thermoplastic polymer and a thermosetting polymer.

21. A holographic data storage medium comprising:
an optically transparent substrate comprising at least one optically transparent plastic material, at least one photochemically active polymeric diarylethene dye based upon polycarbonate, and at least one photo-product thereof;
said optically transparent substrate being at least 100 micrometers thick, said photochemically active dye being present in the optically transparent substrate in an amount corresponding to from about 0.1 to about 10 weight percent based on a total weight of the optically transparent substrate, said optically transparent substrate having a UV-visible absorbance in a range from about 0.1 to 1 at least one wavelength in a range from about 300 nanometers to about 800 nanometers; and said at least one photo-product being patterned within the optically transparent substrate to provide at least one optically readable datum comprised within the holographic storage medium.

22. The holographic data storage medium of claim 21, wherein the at least one photo-product results from a photochemical conversion of the at least one photochemically active polymeric diarylethene dye based upon polycarbonate during the storage of data as a hologram.

23. The holographic data storage medium of claim 21, wherein the photochemically active polymeric diarylethene dye based upon polycarbonate comprises structural units derived from dihydroxy aromatic compound XV

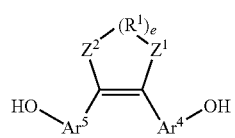

XV wherein "e" is 0 or 1; $R^1$ is a bond, an oxygen atom, a substituted nitrogen atom, a sulfur atom, a selenium atom, a divalent $C_1$-$C_{20}$ aliphatic radical, a halogenated divalent $C_1$-$C_{20}$ aliphatic radical, a divalent $C_3$-$C_{20}$ cycloaliphatic radical, a halogenated divalent $C_1$-$C_{20}$ cycloaliphatic radical, or a divalent $C_2$-$C_{30}$ aromatic radical; $Z^1$ and $Z^2$ are independently a bond, a hydrogen atom, a monovalent $C_1$-$C_{20}$ aliphatic radical, divalent $C_1$-$C_{20}$ aliphatic radical, a monovalent $C_3$-$C_{20}$ cycloaliphatic radical, a divalent $C_3$-$C_{20}$ cycloaliphatic radical, a monovalent $C_2$-$C_{30}$ aromatic radical, or a divalent $C_2$-$C_{30}$ aromatic radical; and $Ar^4$ and $Ar^5$ are each independently a $C_2$-$C_{40}$ aromatic radical.

24. The holographic data storage medium of claim 21, wherein said photochemically active polymeric diarylethene dye based upon polycarbonate comprises structural units derived from a monohydroxy aromatic compound XVI

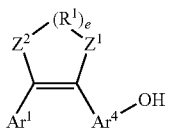

XVI wherein "e" is 0 or 1; $R^1$ is a bond, an oxygen atom, a substituted nitrogen atom, a sulfur atom, a selenium atom, a divalent $C_1$-$C_{20}$ aliphatic radical, a halogenated divalent $C_1$-$C_{20}$ aliphatic radical, a divalent $C_3$-$C_{20}$ cycloaliphatic radical, a halogenated divalent $C_1$-$C_{20}$ cycloaliphatic radical, or a divalent $C_2$-$C_{30}$ aromatic radical; $Ar^1$ is a $C_2$-$C_{40}$ aromatic radical; $Ar^4$ is a $C_2$-$C_{40}$ aromatic radical; and $Z^1$ and $Z^2$ are independently a bond, a hydrogen atom, a monovalent $C_1$-$C_{20}$ aliphatic radical, divalent $C_1$-$C_{20}$ aliphatic radical, a monovalent $C_3$-$C_{20}$ cycloaliphatic radical, a divalent $C_3$-$C_{20}$ cycloaliphatic radical, a monovalent $C_2$-$C_{30}$ aromatic radical, or a divalent $C_2$-$C_{30}$ aromatic radical.

25. The holographic data storage medium of claim 23, wherein $Ar^4$ and $Ar^5$ are independently selected from the group consisting of divalent aromatic radicals XVII, XVIII, and XIX

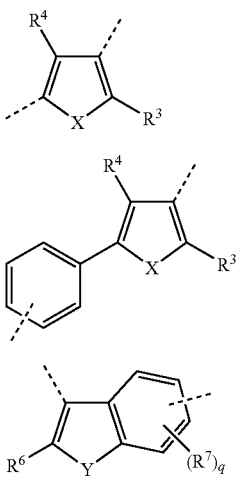

wherein $R^3$, $R^4$, and $R^6$ are hydrogen, a halogen atom, a nitro group, a cyano group, a $C_1$-$C_{10}$ aliphatic radical, a $C_3$-$C_{10}$ cycloaliphatic radical, or a $C_2$-$C_{10}$ aromatic radical; $R^7$ is independently at each occurrence a halogen atom, a nitro group, a cyano group, a $C_1$-$C_{10}$ aliphatic radical, a $C_3$-$C_{10}$ cycloaliphatic radical, or a $C_2$-$C_{10}$ aromatic radical; X and Y are selected from the group consisting of sulfur, selenium, oxygen, NH, and nitrogen substituted by a $C_1$-$C_{10}$ aliphatic radical, a $C_3$-$C_{10}$ cycloaliphatic radical, or a $C_2$-$C_{10}$ aromatic radical; and "q" is a number ranging from 0 to 3.

26. The holographic data storage medium of claim 25, wherein the $Ar^1$ is a phenyl, an anthracenyl, a phenanthrenyl, a pyridinyl, a pyridazinyl, a 1H-phenalenyl, a naphthyl, or a substituted derivative thereof.

27. The holographic data storage medium of claim 25, wherein $Ar^1$ is selected from the group consisting of structures II, III and IV

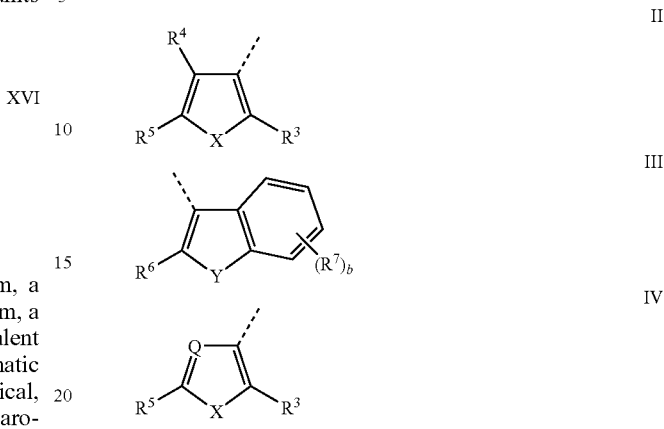

wherein $R^3$, $R^4$, $R^5$, and $R^6$ are hydrogen, a halogen atom, a nitro group, a cyano group, a $C_1$-$C_{10}$ aliphatic radical, a $C_3$-$C_{10}$ cycloaliphatic radical, or a $C_2$-$C_{10}$ aromatic radical; $R^7$ is independently at each occurrence a halogen atom, a nitro group, a cyano group, a $C_1$-$C_{10}$ aliphatic radical, a $C_3$-$C_{10}$ cycloaliphatic radical, or a $C_2$-$C_{10}$ aromatic radical; "b" is an integer from and including 0 to and including 4; X and Y are selected from the group consisting of sulfur, selenium, oxygen, NH, and nitrogen substituted by a $C_1$-$C_{10}$ aliphatic radical, a $C_3$-$C_{10}$ cycloaliphatic radical, or a $C_2$-$C_{10}$ aromatic radical; and Q is CH or N.

28. The holographic data storage medium of 21, wherein the polymeric photochemically active dye comprises structural units derived from dihydroxy aromatic compound XX

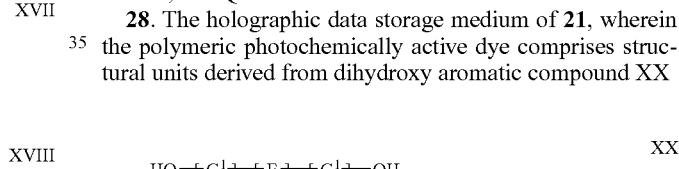

wherein each $G^1$ is independently at each occurrence a $C_6$-$C_{20}$ aromatic radical; E is independently at each occurrence a bond, a $C_3$-$C_{20}$ cycloaliphatic radical, a $C_6$-$C_{20}$ aromatic radical, a $C_1$-$C_{20}$ aliphatic radical, a sulfur atom, a selenium atom, or an oxygen atom; "f" is a number greater than or equal to one; "g" is either zero or one; and "h" is a whole number including zero.

29. The holographic data storage medium of claim 28, wherein dihydroxy aromatic compound XX is selected from the group consisting of 4,4'-oxydiphenol, 4,4'-thiodiphenol, 2,2-bis(4-hydroxyphenyl)propane, 1,1,1,3,3,3-hexafluoro-2,2-bis(4-hydroxyphenyl)propane, 4,4'-biphenol, bis(4-hydroxyphenyl)sulfide, bis(4-hydroxyphenyl)sulfone, 9,9-bis(4-hydroxyphenyl)fluorene, 1,1-bis(4-hydroxyphenyl)cyclohexylmethane, hydroquinone, methyl hydroquinone, resorcinol, 3-(4-hydroxyphenyl)-1,1,3-trimethylindan-5-ol, 2,2,2',2'-tetrahydro-3,3,3',3'-tetramethyl-1,1'-spirobi(1H-indene)-6,6'-diol, and combinations thereof.

30. The holographic data storage medium of claim 21, wherein the active dye has a weight average molecular weight Mw greater than about 2000 grams per mole, as determined by gel permeation chromatography.

31. The holographic data storage medium of claim 21 wherein the photochemically active polymeric diarylethylene dye comprises structural units XXI

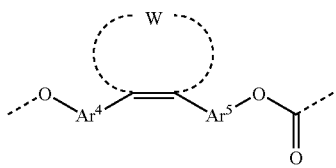

wherein W is a divalent $C_2$-$C_{20}$ aliphatic radical, a $C_3$-$C_{50}$ aromatic radical, or a $C_3$-$C_{50}$ cycloaliphatic radical; $Ar^4$ and $Ar^5$ are each independently a $C_2$-$C_{40}$ aromatic radical; and $Z^1$ and $Z^2$ are independently a bond, a hydrogen atom, a monovalent $C_1$-$C_{20}$ aliphatic radical, divalent $C_1$-$C_{20}$ aliphatic radical, a monovalent $C_3$-$C_{20}$ cycloaliphatic radical, a divalent $C_3$-$C_{20}$ cycloaliphatic radical, a monovalent $C_2$-$C_{30}$ aromatic radical, or a divalent $C_2$-$C_{30}$ aromatic radical.

32. The holographic data storage medium of claim 21 wherein the photochemically active polymeric diarylethene dye comprises structural units XXII

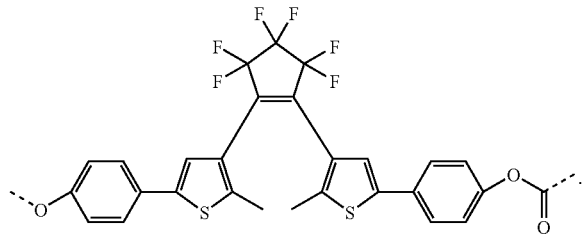

* * * * *

UNITED STATES PATENT AND TRADEMARK OFFICE
CERTIFICATE OF CORRECTION

| | |
|---|---|
| PATENT NO. | : 7,794,896 B2 |
| APPLICATION NO. | : 11/636856 |
| DATED | : September 14, 2010 |
| INVENTOR(S) | : Erben et al. |

Page 1 of 1

It is certified that error appears in the above-identified patent and that said Letters Patent is hereby corrected as shown below:

On the Title Page, Item under ("Primary Examiner"), Line 1, delete "Marin" and insert -- Martin --, therefor.

In Column 8, Line 25, delete "$H_2C_6H_{10}O-$)," and insert -- $H_2NC_6H_{10}-$), --, therefor.

In Column 8, Line 36, delete "$4-CH_3SC_6H_{10}O-$)," and insert -- $4-CH_3SC_6H_{10}-$), --, therefor.

In Column 8, Lines 40-41, delete "$(CH_3O)_3SiCH_2CH_2C_6H_7O-$)," and insert -- $(CH_3O)_3SiCH_2CH_2C_6H_{10}-$), --, therefor.

In Column 37, Line 64, in Claim 26, delete "claim 25," and insert -- claim 24, --, therefor.

In Column 38, Line 1, in Claim 27, delete "claim 25," and insert -- claim 24, --, therefor.

In Column 38, Line 62, in Claim 30, delete "active" and insert -- photochemically active --, therefor.

Signed and Sealed this
Fourth Day of January, 2011

David J. Kappos
*Director of the United States Patent and Trademark Office*